US008654111B2

(12) United States Patent
Uchino et al.

(10) Patent No.: US 8,654,111 B2

(45) Date of Patent: Feb. 18, 2014

(54) PIXEL CIRCUIT AND DISPLAY APPARATUS

(75) Inventors: Katsuhide Uchino, Kanagawa (JP); Junichi Yamashita, Tokyo (JP)

(73) Assignee: Sony Corporation, Tokyo (JP)

( * ) Notice: Subject to any disclaimer, the term of this patent is extended or adjusted under 35 U.S.C. 154(b) by 1088 days.

(21) Appl. No.: 11/992,967

(22) PCT Filed: Nov. 14, 2006

(86) PCT No.: PCT/JP2006/322653

§ 371 (c)(1),
(2), (4) Date: Apr. 2, 2008

(87) PCT Pub. No.: WO2007/055376

PCT Pub. Date: May 18, 2007

(65) Prior Publication Data

US 2009/0251493 A1 Oct. 8, 2009

(30) Foreign Application Priority Data

Nov. 14, 2005 (JP) ................................ 2005-328334

(51) Int. Cl.

| | |
|---|---|
| ***G06F 3/038*** | (2013.01) |
| ***G09G 5/00*** | (2006.01) |
| ***G09G 3/10*** | (2006.01) |
| ***H05B 37/02*** | (2006.01) |

(52) U.S. Cl.

USPC ........ 345/211; 345/204; 345/212; 315/169.1; 315/224

(58) Field of Classification Search

USPC ........................................ 345/204, 211, 212

See application file for complete search history.

(56) References Cited

U.S. PATENT DOCUMENTS 6,356,029 B1 * 3/2002 Hunter ....................... 315/169.1
7,046,220 B2 * 5/2006 Tagawa et al. ................. 345/76

(Continued)

FOREIGN PATENT DOCUMENTS

JP 2002-082651 3/2002
JP 2003-255897 A 9/2003

(Continued)

OTHER PUBLICATIONS

Japanese Office Action issued Aug. 7, 2012 for corresponding Japanese Application No. 2008-328334.

(Continued)

*Primary Examiner* — William Boddie
*Assistant Examiner* — Alecia D English
(74) *Attorney, Agent, or Firm* — Rader, Fishman & Grauer PLLC

(57) ABSTRACT

It is aimed to increase efficiency and simplification of a pixel circuit having a threshold voltage correcting function. A sampling transistor Tr1 is brought into conduction in response to a control signal supplied from a scan line WS and samples a video signal supplied from a signal line SL to a pixel capacitor Cs during a horizontal scanning period. The pixel capacitor Cs applies an input voltage Vgs to a gate G of a drive transistor Trd in response to the sampled video signal. The drive transistor Trd supplies an output current in accordance with the input voltage Vgs to a light-emitting device EL. The output current has dependency on a threshold voltage Vth of the drive transistor Trd. In order to cancel the dependency of the output current on the threshold voltage Vth, there is provided correcting means (Tr3 and Tr4) for operating in part of the horizontal scanning period, detecting the threshold voltage Vth of the drive transistor Trd, and writing the threshold voltage Vth in the pixel capacitor Cs.

16 Claims, 15 Drawing Sheets

(56) References Cited

U.S. PATENT DOCUMENTS

| | | | | |
|---|---|---|---|---|
| 7,319,444 | B2 * | 1/2008 | Jo | 345/76 |
| 7,502,000 | B2 * | 3/2009 | Yuki et al. | 345/77 |
| 7,535,442 | B2 * | 5/2009 | Yamashita et al. | 345/76 |
| 7,839,363 | B2 * | 11/2010 | Kawabe | 345/76 |
| 2004/0183752 | A1 * | 9/2004 | Kawasaki et al. | 345/20 |

FOREIGN PATENT DOCUMENTS

| | | | | | |
|---|---|---|---|---|---|
| JP | 2003-271095 | | 9/2003 | | |
| JP | 2004-341359 | A | 12/2004 | | |
| JP | 2005-099773 | A | 4/2005 | | |
| JP | 2005-172917 | | 6/2005 | | |
| JP | 2002-202255 | A | 7/2005 | | |
| JP | 2005-195756 | A | 7/2005 | | |
| JP | 2005-300702 | A | 10/2005 | | |
| JP | 2006-259374 | A | 9/2006 | | |
| JP | 2009-163275 | A | 7/2009 | | |
| WO | WO03077229 | * | 9/2003 | | G09G 3/30 |
| WO | WO2006011998 | * | 2/2006 | | G09G 3/32 |

OTHER PUBLICATIONS

Office Action of Japanese Patent Application No. 2009-106685 mailed Mar. 27, 2012 (Japan).

Japanese Office Action issued May 15, 2012 for related Japanese Application No. 2009-106686.

* cited by examiner $$Ids = k\mu(Vgs - Vth)^2 = k\mu(Vsig - \Delta V)^2$$

PIXEL CIRCUIT AND DISPLAY APPARATUS

TECHNICAL FIELD

The present invention relates to pixel circuits that are placed for respective pixels and that drive light-emitting devices by current. More specifically, the present invention relates to a pixel circuit that controls the amount of current supplied to a light-emitting device, such as an organic EL (electroluminescent) device, by an insulated gate field effect transistor provided in each pixel circuit and that is applied to a so-called active matrix display apparatus. Also, the present invention relates to a display apparatus including the pixel circuit.

BACKGROUND ART

In an image display apparatus, such as a liquid crystal display, many liquid crystal pixels are arranged in a matrix pattern, and intensity of transmission and reflection of incident light is controlled in each pixel in accordance with image information to be displayed, so that an image is displayed. This is the same in an organic EL display or the like including organic EL devices in pixels, but the organic EL devices are self-light-emitting devices unlike the liquid crystal pixels. Therefore, the organic EL display has advantages of having higher visibility than that of the liquid crystal display, not requiring a backlight, and having high response speed. Also, the brightness level (gray level) of each light-emitting device can be controlled by a value of current flowing thereto, and the organic EL display, which is a so-called current-control type, is significantly different from the liquid crystal display, which is a voltage-control type.

As the liquid crystal display, the drive system of the organic EL display is classified into a simple matrix system and an active matrix system. The former has a simple structure, but has a problem of being difficult to realize a large high-resolution display. For this reason, the active matrix system is now being developed actively. In this system, a current flowing to a light-emitting device in each pixel circuit is controlled by an active device (typically, a thin film transistor (TFT)) provided in the pixel circuit, and this system is described in Japanese Unexamined Patent Application Publication Nos. 2003-255856, 2003-271095, 2004-133240, 2004-029791, and 2004-093682.

Conventional pixel circuits are placed at parts where scan lines in rows supplying control signals and signal lines in columns supplying video signals cross each other, and each of the pixel circuits includes at least a sampling transistor, a capacitor unit, a drive transistor, and a light-emitting device. The sampling transistor is brought into conduction in response to a control signal supplied from the scan line and samples a video signal supplied from the signal line. The capacitor unit holds an input voltage in accordance with the sampled video signal. The drive transistor supplies an output current during a predetermined light-emitting period in accordance with the input voltage held in the capacitor unit. Typically, the output current has dependency on carrier mobility and a threshold voltage in a channel region of the drive transistor. The light-emitting device emits light at brightness according to the video signal by the output current supplied from the drive transistor.

The drive transistor receives, in its gate, the input voltage held in the capacitor unit and supplies an output current between the source and drain, so as to bring the light-emitting device into conduction. Typically, the emission brightness of the light-emitting device is proportional to the amount of current flowing thereto. Furthermore, the amount of output current supplied from the drive transistor is controlled by a gate voltage, that is, the input voltage written in the capacitor unit. In the conventional pixel circuit, the amount of current supplied to the light-emitting device is controlled by changing the input voltage applied to the gate of the drive transistor in accordance with an input video signal.

Here, an operation characteristic of the drive transistor is expressed by the following expression 1.

$$Ids=(1/2)\mu(W/L)Cox(Vgs-Vth)^2 \qquad \text{expression 1}$$

In this transistor characteristic expression 1, Ids represents a drain current flowing between the source and drain, and is an output current supplied to the light-emitting device in the pixel circuit. Vgs represents a gate voltage applied to the gate with reference to the source, and is the above-described input voltage in the pixel circuit. Vth is a threshold voltage of the transistor. Also, μ represents the mobility of a semiconductor thin film constituting a channel of the transistor. Additionally, W represents a channel width, L represents a channel length, and Cox represents a gate capacitance. As is clear from the transistor characteristic expression 1, when a TFT operates in a saturation region, if the gate voltage Vgs rises by exceeding the threshold voltage Vth, the TFT is brought into an ON state and the drain current Ids flows. In principle, as indicated by the above transistor characteristic expression 1, a constant gate voltage Vgs allows the same amount of drain current Ids to be constantly supplied to the light-emitting device. Thus, by supplying the same level of video signals to all the pixels constituting a screen, all the pixels emit light at the same brightness, and uniformity of the screen can be surely obtained.

Actually, however, thin film transistors (TFTs) made of semiconductor thin films of polysilicon or the like have variations in a device characteristic. Particularly, the threshold voltage Vth is not constant and varies in each pixel. As is clear from the above transistor characteristic expression 1, if the threshold voltage Vth varies in each drive transistor, the drain current Ids varies and the brightness also varies in each pixel even if the gate voltage Vgs is constant, so that the uniformity of the screen is impaired. Conventionally, a pixel circuit having a function of cancelling variations in threshold voltage of a drive transistor has been developed, which is disclosed in the above-mentioned Japanese Unexamined Patent Application Publication No. 2004-133240, for example.

However, the conventional pixel circuit having the function of cancelling variations in threshold voltage (threshold voltage correcting function) has a complicated structure, which inhibits miniaturization or higher-resolution of pixels. Also, the conventional pixel circuit having the threshold voltage correcting function is inefficient and causes a complicated circuit design. In addition, the conventional pixel circuit having the threshold voltage correcting function causes a decrease in yield because the number of elements provided therein is relatively large.

DISCLOSURE OF INVENTION

In view of the above-described problems of the related arts, an object of the present invention is to increase efficiency and simplicity of a pixel circuit having a threshold voltage correcting function so as to achieve higher resolution and improvement of the yield of a display apparatus. In order to achieve the object, the following measures are taken. That is, the present invention is characterized in that, in a pixel circuit that is placed at a part where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor during a horizontal scanning period assigned to the scan line, wherein the pixel capacitor applies an input voltage to a gate of the drive transistor in response to the sampled video signal, wherein the drive transistor supplies an output current in accordance with the input voltage to the light-emitting device during a predetermined light-emitting period and the output current has dependency on a threshold voltage in a channel region of the drive transistor, and wherein the light-emitting device emits light at brightness in accordance with the video signal by the output current supplied from the drive transistor, the pixel circuit comprises correcting means that operates in part of the horizontal scanning period and that detects the threshold voltage of the drive transistor and writes the threshold voltage in the pixel capacitor in order to cancel the dependency of the output current on the threshold voltage.

Preferably, the correcting means operates during the horizontal scanning period in a state where the sampling transistor is in conduction and one end of the pixel capacitor is held at a certain potential by the signal line and charges the pixel capacitor until a potential difference from the other end of the pixel capacitor to the certain potential becomes the threshold voltage. Also, the correcting means detects the threshold voltage of the drive transistor and writes the threshold voltage in the pixel capacitor in a first half of the horizontal scanning period, whereas the sampling transistor samples the video signal supplied from the signal line to the pixel capacitor in a latter half of the horizontal scanning period, and the pixel capacitor applies an input voltage between the gate and source of the drive transistor, the input voltage being the sum of the sampled video signal and the written threshold voltage, thereby cancelling the dependency of the output current on the threshold voltage. Also, the correcting means includes a first switching transistor that is brought into conduction before the horizontal scanning period and that makes setting so that a potential difference across the pixel capacitor exceeds the threshold voltage; and a second switching transistor that is brought into conduction during the horizontal scanning period and that charges the pixel capacitor until the potential difference across the pixel capacitor becomes the threshold voltage. Also, the first switching transistor is brought into conduction in response to a control signal supplied from another scan line positioned before the scan line during a preceding horizontal scanning period assigned to the other scan line, thereby making setting so that the potential difference across the pixel capacitor exceeds the threshold voltage. Also, the first switching transistor is brought into conduction in response to a control signal supplied from another scan line positioned just before the scan line during an immediately preceding horizontal scanning period assigned to the other scan line, thereby making setting so that the potential difference across the pixel capacitor exceeds the threshold voltage. Also, the sampling transistor samples the video signal supplied from the signal line to the pixel capacitor during a signal supplying period when the signal line is at a potential of the video signal in the horizontal scanning period, whereas the correcting means detects the threshold voltage of the drive transistor and writes the threshold voltage in the pixel capacitor during a signal fixed period when the signal line is at a certain potential in the horizontal scanning period. Also, the correcting means operates also in signal fixed periods in horizontal scanning periods assigned to other scan lines and charges the pixel capacitor to the threshold voltage in a timesharing manner in each signal fixed period. Also, the signal fixed periods are horizontal blanking periods to delimit the respective horizontal scanning periods that are sequentially assigned to the respective scan lines, and the correcting means charges the pixel capacitor to the threshold voltage in a timesharing manner in each horizontal blanking period. Also, after the correcting means has charged the pixel capacitor in each signal fixed period, the sampling transistor is closed and the pixel capacitor is electrically disconnected from the signal line before the signal line is switched from the certain potential to the potential of the video signal. Also, the output current of the drive transistor has dependency also on carrier mobility in addition to the threshold voltage in the channel region, and the correcting means operates in part of the horizontal scanning period, takes the output current from the drive transistor in a state where the video signal is sampled, and negatively feeds back the output current to the pixel capacitor to correct the input voltage, in order to cancel the dependency of the output current on the carrier mobility.

Also, the present invention is characterized in that, in a pixel circuit that is placed at a part where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor during a horizontal scanning period assigned to the scan line, wherein the pixel capacitor applies an input voltage to a gate of the drive transistor in response to the sampled video signal, wherein the drive transistor supplies an output current in accordance with the input voltage to the light-emitting device during a predetermined light-emitting period and the output current has dependency on a threshold voltage in a channel region of the drive transistor, and wherein the light-emitting device emits light at brightness in accordance with the video signal by the output current supplied from the drive transistor, the pixel circuit comprises correcting means that detects the threshold voltage of the drive transistor and writes the threshold voltage in the pixel capacitor in order to cancel the dependency of the output current on the threshold voltage, that the correcting means includes a first switching transistor and a second switching transistor, that the first switching transistor is brought into conduction in response to a control signal supplied from another scan line positioned before the scan line during a preceding horizontal scanning period assigned to the other scan line, thereby making setting so that a potential difference across the pixel capacitor exceeds the threshold voltage, and that the second switching transistor is brought into conduction during the horizontal scanning period and charges the pixel capacitor until the potential difference across the pixel capacitor becomes the threshold voltage.

Preferably, the first switching transistor is brought into conduction in response to a control signal supplied from another scan line positioned just before the scan line during an immediately preceding horizontal scanning period assigned to the other scan line, thereby making setting so that the potential difference across the pixel capacitor exceeds the threshold voltage.

Furthermore, the present invention is characterized in that, in a pixel circuit that is placed at a part where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor during a horizontal scanning period assigned to the scan line, wherein the pixel capacitor applies an input voltage to a gate of the drive transistor in response to the sampled video signal, wherein the drive transistor supplies an output current in accordance with the input voltage to the light-emitting device during a predetermined light-emitting period and the output current has dependency on a threshold voltage in a channel region of the drive transistor, and wherein the light-emitting device emits light at brightness in accordance with the video signal by the output current supplied from the drive transistor, the pixel circuit comprises correcting means that detects the threshold voltage of the drive transistor and writes the threshold voltage in the pixel capacitor prior to sampling of the video signal in order to cancel the dependency of the output current on the threshold voltage, and that the correcting means operates in a plurality of horizontal scanning periods assigned to a plurality of scan lines and charges the pixel capacitor to the threshold voltage in a timesharing manner.

Preferably, the sampling transistor samples the video signal supplied from the signal line to the pixel capacitor during a signal supplying period when the signal line is at the potential of the video signal in the horizontal scanning period assigned to the scan line, whereas correcting means detects the threshold voltage of the drive transistor and charges the pixel capacitor to the threshold voltage in a timesharing manner during respective signal fixed periods when the signal line is at a certain potential in the respective horizontal scanning periods assigned to the plurality of scan lines. Also, the signal fixed periods are horizontal blanking periods to delimit the respective horizontal scanning periods that are sequentially assigned to the respective scan lines, and the correcting means charges the pixel capacitor to the threshold voltage in a timesharing manner in each horizontal blanking period. Also, after the correcting means has charged the pixel capacitor in each signal fixed period, the sampling transistor is closed and the pixel capacitor is electrically disconnected from the signal line before the signal line is switched from the certain potential to the potential of the video signal.

The pixel circuit according to the present invention includes the correcting means in order to cancel the dependency of the output current supplied to the light-emitting device on the threshold voltage. As a feature, the correcting means operates in part of a horizontal scanning period, detects the threshold voltage of the drive transistor, and writes the threshold voltage in the pixel capacitor in advance. An operation of correcting the threshold voltage is performed by using part of the horizontal scanning period, when sampling of the video signal to the pixel capacitor is performed, so that the configuration of the correcting means can be simplified. Specifically, the correcting means according to the present invention can be constituted by the first switching transistor that is brought into conduction before the horizontal scanning period and resets the pixel capacitor in advance and the second switching transistor that is brought into conduction during the horizontal scanning period and charges the reset pixel capacitor with the threshold voltage. Thus, the pixel circuit according to the present invention can be constituted by the first and second switching transistors constituting the correcting means, the sampling transistor to sample the video signal, and the drive transistor to drive the light-emitting element. In this way, the pixel circuit according to the present invention can be constituted by the four transistors, and the number of devices can be reduced. Accordingly, the number of power supply lines and gate lines can be reduced and crossovers of lines can be reduced, so that the yield can be improved. At the same time, higher resolution of the panel can be realized.

Also, according to the present invention, the above-described first switching transistor uses another scan line positioned before the scan line assigned to the pixel as a gate line for control. Specifically, the first switching transistor constituting the correcting means of the present invention is brought into conduction in response to a control signal supplied from another scan line positioned before the scan line during a preceding horizontal scanning period assigned to the other scanning line, thereby resetting the pixel capacitor. In this way, by using a scan line belonging to a preceding row as a gate line of the first switching transistor constituting the correcting means, the total number of gate lines is reduced, thereby reducing crossovers of lines, which leads to improvement of the yield. At the same time, higher resolution of the panel can be realized.

Furthermore, according to the present invention, the correcting means incorporated in the pixel circuit operates in a plurality of horizontal scanning periods assigned to a plurality of scan lines and charges the pixel capacitor to the threshold voltage in a timesharing manner. In this way, by distributing a threshold voltage correcting operation to the plurality of horizontal scanning periods to divide the operation into a plurality of times of operations, the threshold voltage correcting time in each horizontal scanning period can be set to short. Accordingly, a sufficient sampling time of a video signal in one horizontal scanning period can be ensured. Thus, even in a high-resolution and high-frequency-driven panel, a video signal potential can be sufficiently written in the pixel capacitor. Accordingly, higher resolution and higher-frequency driving of a display panel can be realized.

BEST MODES FOR CARRYING OUT THE INVENTION

Figure 1:
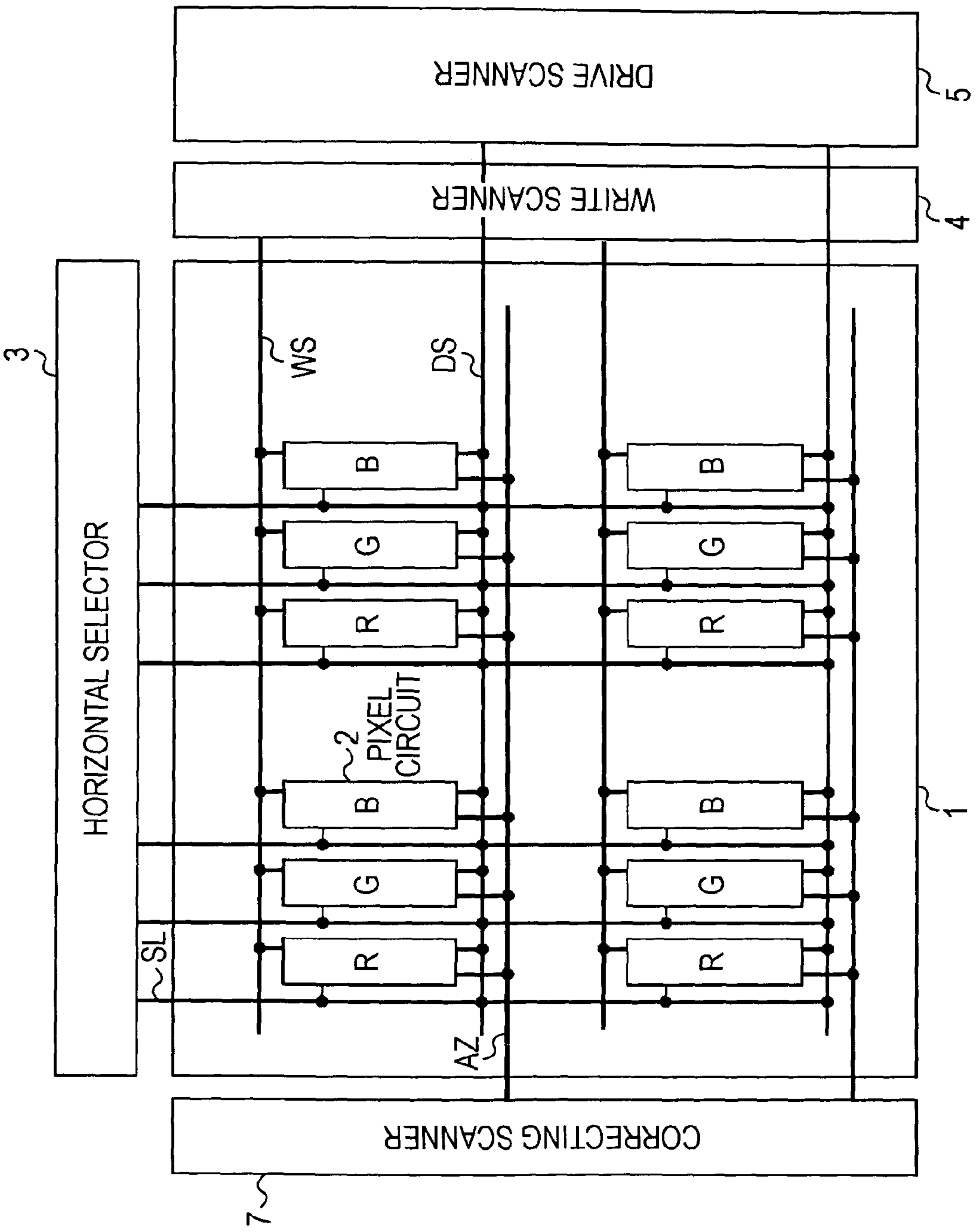
FIG. 1 is a block diagram illustrating a display apparatus according to the present invention.

Hereinafter, embodiments of the present invention are described in detail with reference to the drawings. First, an entire configuration of an active matrix display apparatus having a threshold voltage (Vth) correcting function is described with reference to FIG. 1. As illustrated in the figure, the active matrix display apparatus includes a pixel array 1 serving as a main unit and a peripheral circuit unit. The peripheral circuit unit includes a horizontal selector 3, a write scanner 4, a drive scanner 5, a correcting scanner 7, and so on. The pixel array 1 includes scan lines WS in rows, signal lines SL in columns, and pixels R, G, and B arranged in a matrix pattern at parts where the both lines cross each other. Pixels of three primary colors RGB are provided for enabling color display, but the present invention is not limited to this. Each of the pixels R, G, and B includes a pixel circuit 2. The signal lines SL are driven by the horizontal selector 3. The horizontal selector 3 constitutes a signal unit and supplies video signals to the signal lines SL. The scan lines WS are scanned by the write scanner 4. Also, other scan lines DS and AZ are provided in parallel with the scan lines WS. The scan lines DS are scanned by the drive scanner 5. The scan lines AZ are scanned by the correcting scanner 7. The write scanner 4, the drive scanner 5, and the correcting scanner 7 constitute a scanner unit and sequentially scan rows of pixels in each horizontal period. Each pixel circuit 2 samples a video signal from the signal line SL when selected by the scan line WS. Furthermore, the pixel circuit 2 drives a light-emitting device included in the pixel circuit 2 in response to the sampled video signal when selected by the scan line DS. In addition, the pixel circuit 2 performs a predetermined correcting operation when scanned by the scan line AZ.

The above-described pixel array 1 is typically formed on an insulating substrate, such as glass, and is a flat panel. Each pixel circuit 2 includes an amorphous silicon thin film transistor (TFT) or a low-temperature polysilicon TFT. In the case of the amorphous silicon TFT, the scanner unit is constituted by TAB or the like separated from the panel, and is connected to the flat panel via a flexible cable. In the case of the low-temperature polysilicon TFT, the signal unit and the scanner unit can also be formed by the low-temperature polysilicon TFT, and thus the pixel array unit, the signal unit, and the scanner unit can be integrally formed on the flat panel.

Figure 2:
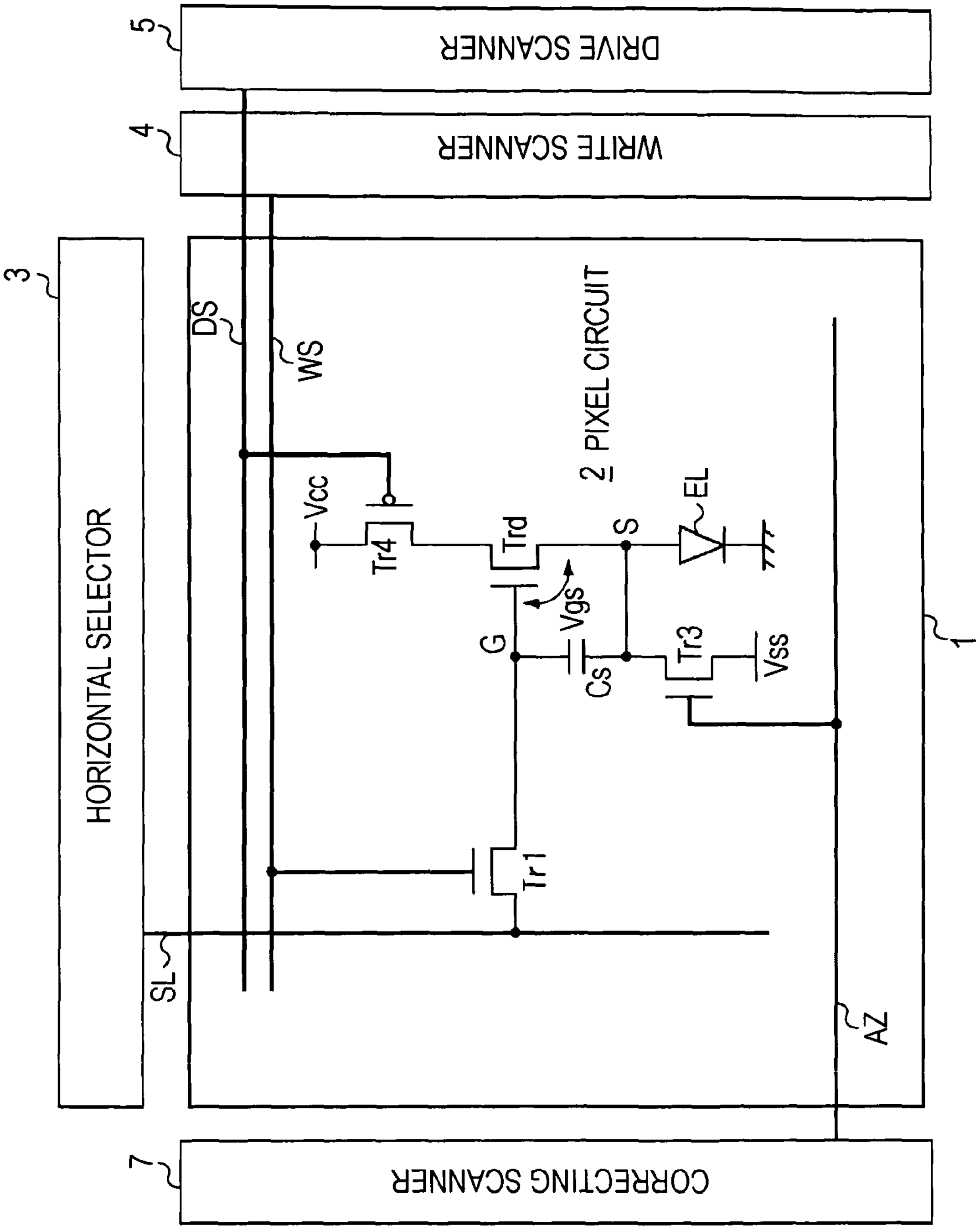
FIG. 2 is a circuit diagram illustrating a first embodiment of a pixel circuit included in the display apparatus illustrated in FIG. 1.

FIG. 2 is a circuit diagram illustrating a first embodiment of the pixel circuit 2 incorporated into the display apparatus illustrated in FIG. 1. The pixel circuit 2 includes four TFTs Tr1, Tr3, Tr4, and Trd, one capacitor element (pixel capacitor) Cs, and one light-emitting device EL. The transistors Tr1, Tr3, and Trd are N-channel polysilicon TFTs. Only the transistor Tr4 is a P-channel polysilicon TFT. The capacitor element Cs constitutes a pixel capacitor of the pixel circuit 2. The light-emitting device EL is a diode-type organic EL device including an anode and a cathode, for example. However, the present invention is not limited to this, but the light-emitting device includes all devices that typically emit light by current drive.

In the drive transistor Trd, which is a main component of the pixel circuit 2, the gate G connects to one end of the pixel capacitor Cs, and the source S connects to the other end of the pixel capacitor Cs. The drain of the drive transistor Trd connects to a power supply Vcc via the first switching transistor Tr4. The gate of the switching transistor Tr4 connects to the scan line DS. The anode of the light-emitting device EL connects to the source S of the drive transistor Trd, and the cathode is grounded. The ground potential may be represented by Vcath. Also, the second switching transistor Tr3 exists between the source S of the drive transistor Trd and a predetermined reference potential Vss. The gate of the transistor Tr3 connects to the scan line AZ. On the other hand, the sampling transistor Tr1 connects between the signal line SL and the gate G of the drive transistor Trd. The gate of the sampling transistor Tr1 connects to the scan line WS.

In this configuration, the sampling transistor Tr1 is brought into conduction in response to a control signal WS supplied from the scan line WS and samples a video signal Vsig supplied from the signal line SL to the pixel capacitor Cs during a horizontal scanning period (1H) assigned to the scan line WS. The pixel capacitor Cs applies an input voltage Vgs to the gate of the drive transistor Trd in response to the sampled video signal Vsig. The drive transistor Trd supplies an output current Ids in accordance with the input voltage Vgs to the light-emitting device EL during a predetermined light-emitting period. The output current Ids has dependency on the threshold voltage Vth in a channel region of the drive transistor Trd. The light-emitting device EL emits light at brightness in accordance with the video signal Vsig by the output current Ids supplied from the drive transistor Trd.

As a feature of the present invention, the pixel circuit 2 includes correcting means including the first switching transistor Tr3 and the second switching transistor Tr4. This correcting means operates in part of the horizontal scanning period (1H), detects the threshold voltage Vth of the drive transistor Trd, and writes it in the pixel capacitor Cs, in order to cancel the dependency of the output current Ids on the threshold voltage Vth. This correcting means operates in a state where the sampling transistor Tr1 is in conduction and one end of the pixel capacitor Cs is held at a certain potential Vss0 by the signal line SL during the horizontal scanning period (1H), and charges the pixel capacitor Cs until a potential difference from the other end of the pixel capacitor Cs to the certain potential Vss0 becomes the threshold voltage Vth. This correcting means detects the threshold voltage Vth of the drive transistor Trd and writes it in the pixel capacitor Cs in the first half of the horizontal scanning period (1H), whereas the sampling transistor Tr1 samples the video signal Vsig supplied from the signal line SL to the pixel capacitor Cs in the latter half of the horizontal scanning period (1H). The pixel capacitor Cs applies the input voltage Vgs, which is the sum of the sampled video signal Vsig and the written threshold voltage Vth, between the gate G and source S of the drive transistor Trd, thereby cancelling the dependency of the output current Ids on the threshold voltage Vth. This correcting means includes the first switching transistor Tr3, which is brought into conduction before the horizontal scanning period (1H) and which performs reset so that the potential difference across the pixel capacitor Cs exceeds the threshold voltage Vth, and the second switching transistor Tr4, which is brought into conduction during the horizontal scanning period (1H) and which charges the pixel capacitor Cs until the potential difference across the pixel capacitor Cs becomes the threshold voltage Vth. The sampling transistor Tr1 samples the video signal Vsig supplied from the signal line SL to the pixel capacitor Cs during a signal supplying period when the signal line SL is at the potential of the video signal Vsig in the horizontal scanning period (1H), whereas the correcting means detects the threshold voltage Vth of the drive transistor Trd and writes it in the pixel capacitor Cs during a signal fixed period when the signal line SL is at the certain potential Vss0 in the horizontal scanning period (1H).

In this embodiment, the output current Ids from the drive transistor Trd has dependency on carrier mobility μ in addition to the threshold voltage Vth in the channel region. In order to deal with this, the correcting means of the present invention operates in part of the horizontal scanning period (1H) in order to cancel the dependency of the output current Ids on the carrier mobility μ, takes the output current Ids from the drive transistor Trd in a state where the video signal Vsig is sampled, and negatively feeds back the output current Ids, so as to correct the input voltage Vgs.

Figure 3:
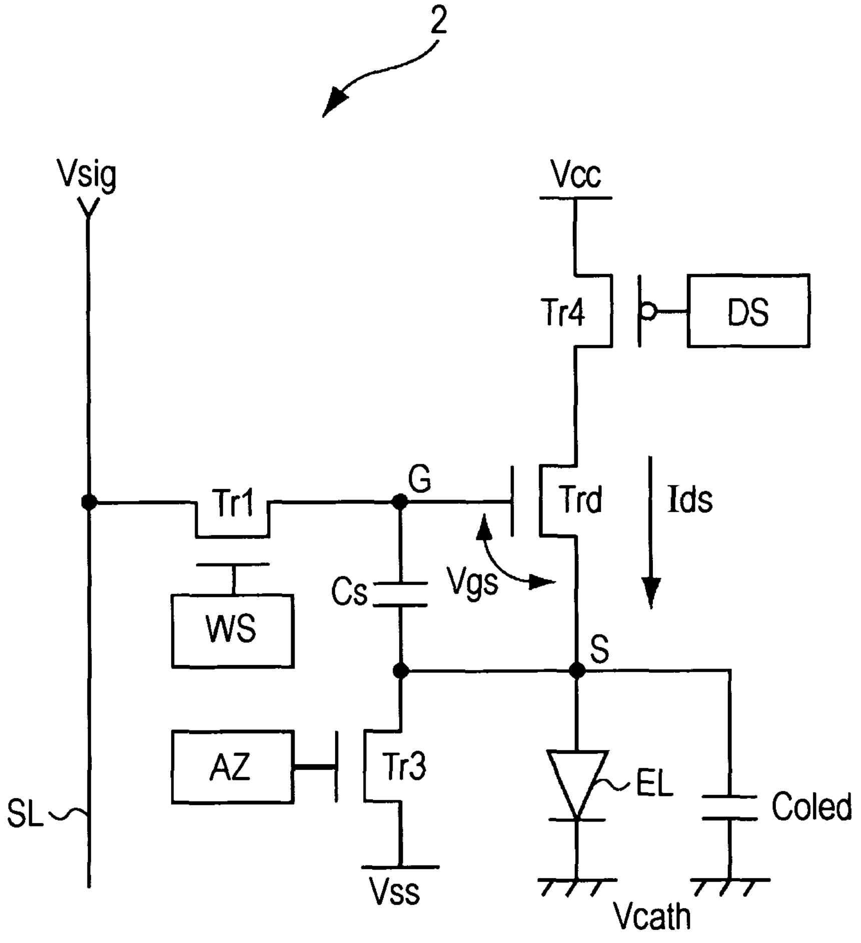
FIG. 3 is a schematic view illustrating the pixel circuit included in the display apparatus illustrated in FIG. 2.

FIG. 3 is a schematic view of the part of the pixel circuit 2 in the display apparatus illustrated in FIG. 2. For easy understanding, the video signal Vsig sampled by the sampling transistor Tr1, the input voltage Vsig and the output current Ids of the drive transistor Trd, and furthermore, a capacitor component Coled held by the light-emitting device EL, are also shown. Also, the scan lines WS, DS, and AZ connected to the gates of the respective transistors are shown. This pixel circuit 2 performs a Vth correcting operation and a video signal writing operation during the horizontal scanning period. Accordingly, the pixel circuit 2 can be constituted by the four transistors Tr1, Tr3, Tr4, and Trd, the one pixel capacitor Cs, and the one light-emitting device EL. Compared to the conventional pixel circuit having a Vth correcting function, at least one transistor can be reduced. Accordingly, at least one power-supply line and one gate line (scan line) can be reduced, which leads to improvement in yield of panels. Also, simplified layout of the pixel circuit enables higher resolution.

Figure 4:
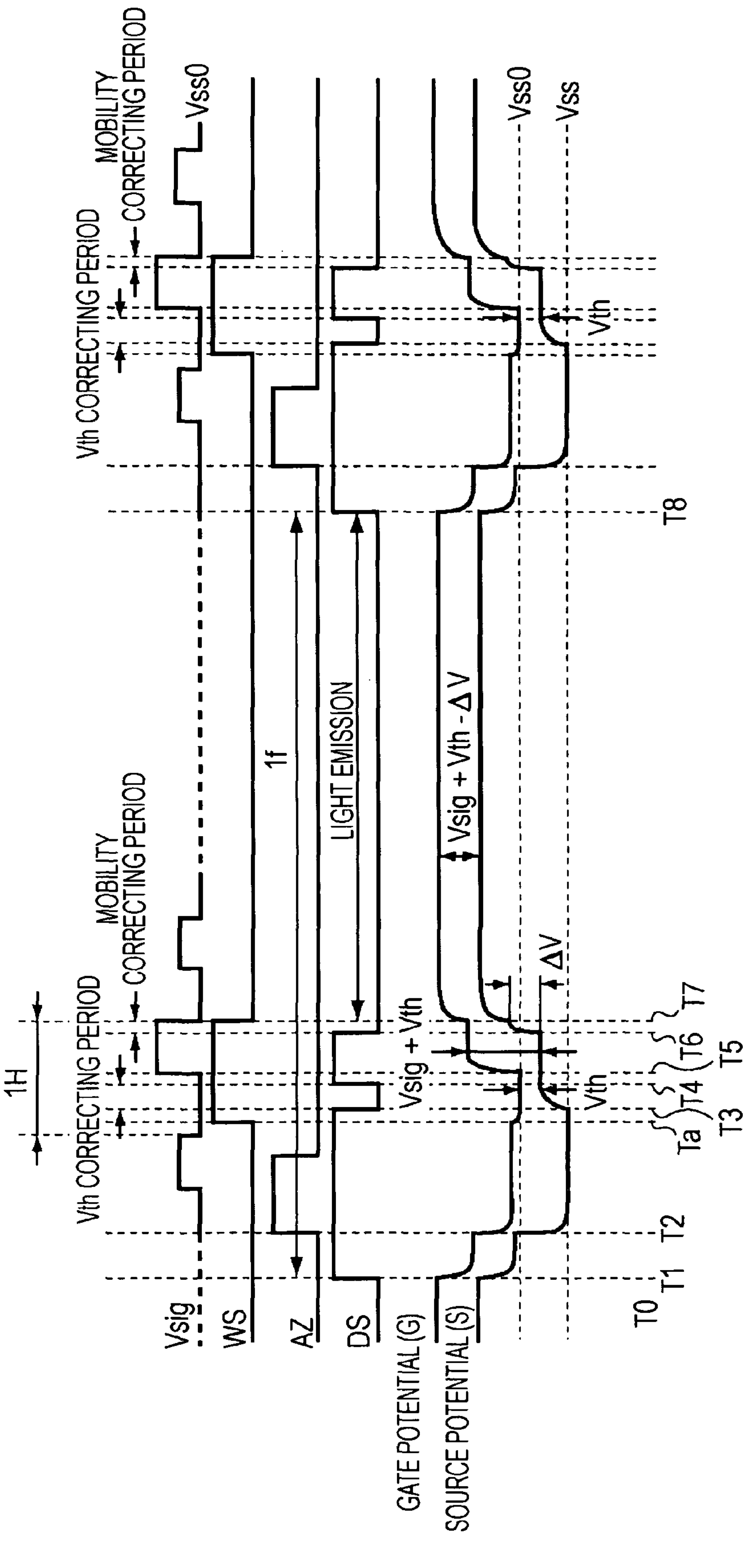
FIG. 4 is a timing chart for describing an operation of the pixel circuit illustrated in FIG. 3.

FIG. 4 is a timing chart of the pixel circuit illustrated in FIGS. 2 and 3. An operation of the pixel circuit illustrated in FIGS. 2 and 3 is specifically described in detail with reference to FIG. 4. FIG. 4 illustrates the waveforms of control signals applied to the respective scan lines WS, AZ, and DS, along a time axis T. In order to simplify the illustration, each control signal is indicated with the same code as that of the corresponding scan line. Also, the waveform of the video signal Vsig applied to the signal line is illustrated along the time axis T. As illustrated in the figure, the video signal Vsig is at the certain potential Vss0 in the first half of each horizontal scanning period H, and is at a signal potential in the latter half. The transistors Tr1 and Tr3 are N-channel transistors, and are thus turned ON when the scan lines WS and AZ are in a high level and are turned OFF in a low level. On the other hand, the transistor Tr4 is a P-channel transistor, and is thus turned OFF when the scan line DS is in a high level and is turned ON in a low level. Also, this timing chart illustrates changes in potential of the gate G and source S of the drive transistor Trd, together with the waveforms of the respective control signals WS, AZ, and DS and the waveform of the video signal Vsig.

In the timing chart in FIG. 4, timings T1 to T8 correspond to one field (1_f_). The respective rows of the pixel array are sequentially scanned once during the one field. The timing chart illustrates the waveforms of the respective control signals WS, AZ, and DS that are applied to the pixels of one row.

At timing T0 before the field starts, all the control signals WS, AZ, and DS are in a low level. Thus, the N-channel transistors Tr1 and Tr3 are in an OFF state, whereas only the P-channel transistor Tr4 is in an ON state. Thus, the drive transistor Trd connects to the power supply Vcc via the ON-state transistor Tr4, and thus supplies the output current Ids to the light-emitting device EL in accordance with the predetermined input voltage Vgs. Thus, the light-emitting device EL emits light at timing T0. The input voltage Vgs applied to the drive transistor Trd at this time is expressed by a difference between a gate potential (G) and a source potential (S).

At timing T1 when the field starts, the control signal DS is switched from a low level to a high level. Accordingly, the transistor Tr4 is turned OFF and the drive transistor Trd is disconnected from the power supply Vcc, so that light emission stops to enter a non-light-emitting period. At timing T1, all the transistors Tr1, Tr3, and Tr4 are brought into an OFF state.

Then, at timing T2, the control signal AZ rises from a low level to a high level, and the switching transistor Tr3 is turned ON. Accordingly, the reference potential Vss is written in the other end of the pixel capacitor Cs and the source S of the drive transistor Trd. At this time, the gate potential of the drive transistor Trd is high impedance, and thus the gate potential (G) drops in accordance with a drop of the source potential (S).

After that, the control signal AZ returns to a low level and the switching transistor Tr3 is turned OFF. Then, at timing Ta, the control signal WS becomes a high level and the sampling transistor Tr1 is brought into conduction. At this time, the potential that appears in the signal line is set to the predetermined certain potential Vss0. Here, Vss0 and Vss are set so that Vss0−Vss>Vth is satisfied. Vss0−Vss is the input voltage Vgs of the drive transistor Trd. Here, Vgs>Vth is realized as preparation for the Vth correcting operation performed thereafter. In other words, at timing Ta, the both ends of the pixel capacitor Cs are set at a voltage exceeding Vgs, and the pixel capacitor Cs is reset prior to the Vth correcting operation. Furthermore, by setting VthEL>Vss, wherein VthEL is a threshold voltage of the light-emitting device EL, a reverse bias is applied to the light-emitting device EL. This is necessary for normally performing the Vth correcting operation thereafter.

Then, at timing T3, the control signal DS is switched to a low level, the switching transistor Tr4 is turned ON, and Vth correction is performed. At this time, the potential of the signal line is still held at the certain potential Vss0 in order to accurately perform Vth correction. Turn ON of the switching transistor Tr4 causes the drive transistor Trd to be connected to the power supply Vcc, inducing flow of the output current Ids. Accordingly, the pixel capacitor Cs is charged, and the source potential (S) connected to the other end thereof rises. On the other hand, the potential (gate potential G) of one end of the pixel capacitor Cs is fixed to Vss0. Thus, the source potential (S) rises in accordance with the charge of the pixel capacitor Cs, and the drive transistor Trd is cut off when the input voltage Vgs reaches just Vth. When the drive transistor Trd is cut off, the source potential (S) thereof becomes Vss0−Vth, as illustrated in the timing chart.

Then, at timing T4, the control signal DS is returned to a high level and the switching transistor Tr4 is turned OFF, so that the Vth correcting operation ends. With this correcting operation, a voltage corresponding to the threshold voltage Vth is written in the pixel capacitor Cs.

In this way, Vth correction is performed from timing T3 to timing T4, when half of one horizontal scanning period (1H) elapses, and then the potential of the signal line changes from Vss0 to Vsig. Accordingly, the video signal Vsig is written in the pixel capacitor Cs. The pixel capacitor Cs is sufficiently small compared to the equivalent capacitor Coled of the light-emitting device EL. As a result, a most part of the video signal Vsig is written in the pixel capacitor Cs. Therefore, the voltage Vgs between the gate G and source S of the drive transistor Trd becomes a level of the sum of Vth that was previously detected and held and Vsig that is sampled this time (Vsig+Vth). The gate-source voltage Vgs becomes Vsig+Vth, as illustrated in the timing chart in FIG. 4. Sampling of the video signal Vsig continues until timing T7, when the control signal WS returns to a low level. That is, timing T5 to timing T7 correspond to the sampling period.

As described above, in the present invention, the Vth correcting period T3-T4 and the sampling period T5-T7 are included in one horizontal scanning period (1H). During 1H, the control signal WS for sampling is in a high level. In the present invention, Vth correction and Vsig writing are performed in a state where the sampling transistor Tr1 is in an ON state. Accordingly, the configuration of the pixel circuit 2 is simplified.

In this embodiment, correction of the mobility μ is performed at the same time in addition to the above-described Vth correction. However, the present invention is not limited to this, but of course can be applied to a pixel circuit not performing mobility μ correction but performing only a simple Vth correcting operation. Also, in the pixel circuit 2 according to this embodiment, N-channel and P-channel transistors are used as the transistors other than the drive transistor Trd. However, the present invention is not limited to this, but the transistors may be constituted by only N-channel transistors or only P-channel transistors.

Correction of the mobility μ is performed from timing TG to timing T7. Hereinafter, this point is described in detail. The control signal DS becomes a low level and the switching transistor Tr4 is turned ON at timing T6, before timing T7 when the sampling period ends. Accordingly, the drive transistor Trd is connected to the power supply Vcc, and thus the pixel circuit enters a light-emitting period from a non-light-emitting period. In this way, mobility correction of the drive transistor Trd is performed in the period T6-T7 when the sampling transistor Tr1 is still in an ON state and the switching transistor Tr4 has entered an ON state. That is, in this embodiment, mobility correction is performed in the period T6-T7 when an end part of the sampling period and a head part of the light-emitting period overlap each other. Note that, at the head of the light-emitting period when the mobility correction is performed, the light-emitting device EL is in a reverse bias state and thus does not emit light. In this mobility correcting period T6-T7, a drain current Ids flows in the drive transistor Trd in a state where the gate G of the drive transistor Trd is fixed to the level of the video signal Vsig. Here, the setting of Vss0−Vth<VthEL allows the light-emitting device EL to be in a reverse bias state, thereby having a simple capacitance characteristic instead of a diode characteristic. Thus, the current Ids flowing in the drive transistor Trd is written into a capacitor C=Cs+Coled, which is a combination of the pixel capacitor Cs and the equivalent capacitor Coled of the light-emitting device EL. Accordingly, the source potential (S) of the drive transistor Trd rises. This rise is represented by ΔV in the timing chart in FIG. 4. This rise ΔV is eventually subtracted from the gate-source voltage Vgs held in the pixel capacitor Cs, which is equivalent to negative feedback. In this way, by negatively feeding back the output current Ids of the drive transistor Trd to the input voltage Vgs of the drive transistor Trd, the mobility μ can be corrected. Note that the negative feedback amount ΔV can be optimized by adjusting a time width t of the mobility correcting period T6-T7.

At timing T7, the control signal WS becomes a low level and the sampling transistor Tr1 is turned OFF. As a result, the gate G of the drive transistor Trd is disconnected from the signal line SL. Since application of the video signal Vsig stops, the gate potential (G) of the drive transistor Trd can rise and rises with the source potential (S). During that time, the gate-source voltage Vgs held in the pixel capacitor Cs maintains a value of (Vsig−ΔV+Vth). With the rise of the source potential (S), the reverse bias state of the light-emitting device EL is canceled, and thus inflow of the output current Ids causes the light-emitting device EL to actually start light emission. At this time, the relationship between the drain current Ids and the gate voltage Vgs can be given as expressed in the following expression 2 by substituting Vsig−ΔV+Vth into Vgs in the above transistor characteristic expression 1.

$$Ids=k\mu(Vgs-Vth)^2=k\mu(Vsig-\Delta V)^2 \qquad \text{expression 2}$$

In the above expression 2, k=(½)(W/L)Cox. The term of Vth is canceled from this characteristic expression 2, and it is understood that the output current Ids supplied to the light-emitting device EL does not depend on the threshold voltage Vth of the drive transistor Trd. Basically, the drain current Ids is determined by the signal voltage Vsig of the video signal. In other words, the light-emitting device EL emits light at brightness in accordance with the video signal Vsig. At that time, Vsig is corrected with the feedback amount ΔV. This correction amount ΔV acts to cancel the effect of the mobility μ positioned at a coefficient part of the characteristic expression 2. Thus, the drain current Ids substantially depends on only the video signal Vsig.

Finally, at timing T8, the control signal DS becomes a high level, the switching transistor Tr4 is turned OFF, and light emission ends and also the field ends. Then, the next field starts and the Vth correcting operation, the mobility correcting operation, and the light emitting operation are repeated again.

Figure 5:
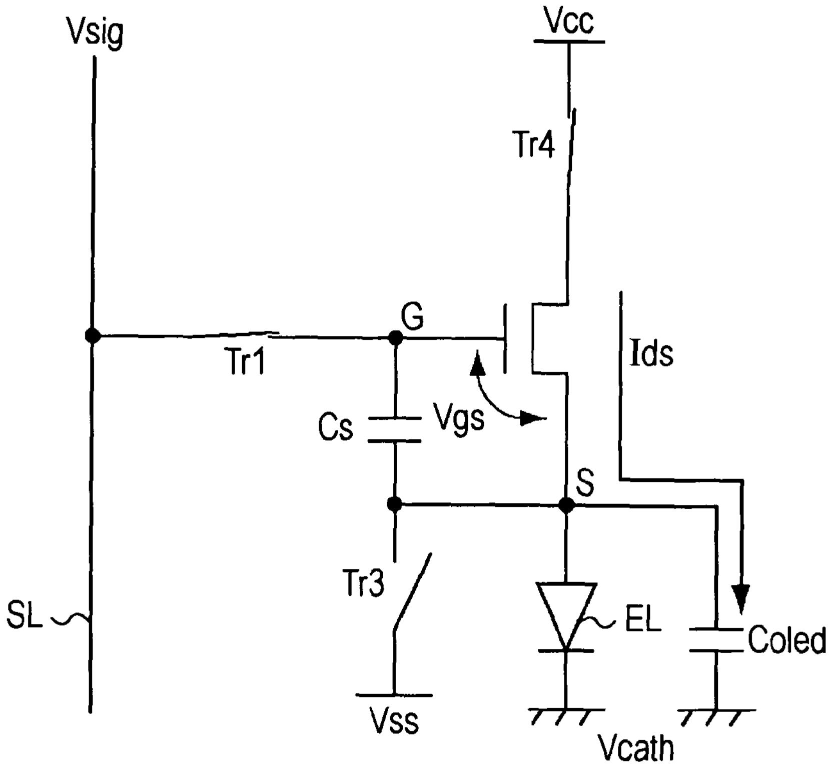
FIG. 5 is a schematic view for describing the operation of the pixel circuit illustrated in FIG. 3.

FIG. 5 is a circuit diagram illustrating a state of the pixel circuit 2 in the mobility correcting period T6-T7. As illustrated in the figure, in the mobility correcting period T6-T7, the sampling transistor Tr1 and the switching transistor Tr4 are in an ON state, whereas the other switching transistor Tr3 is in an OFF state. In this state, the source potential (S) of the drive transistor Tr4 is Vss0−Vth. This source potential S is an anode potential of the light-emitting device EL. As described above, setting of Vss0−Vth<VthEL allows the light-emitting device EL to be in a reverse bias state and to have a simple capacitance characteristic instead of a diode characteristic. Accordingly, the current Ids flowing in the drive transistor Trd flows into the composite capacitor C=Cs+Coled of the pixel capacitor Cs and the equivalent capacitor Coled of the light-emitting device EL. In other words, part of the drain current Ids is negatively fed back to the pixel capacitor Cs, so that correction of the mobility is performed.

Figure 6:
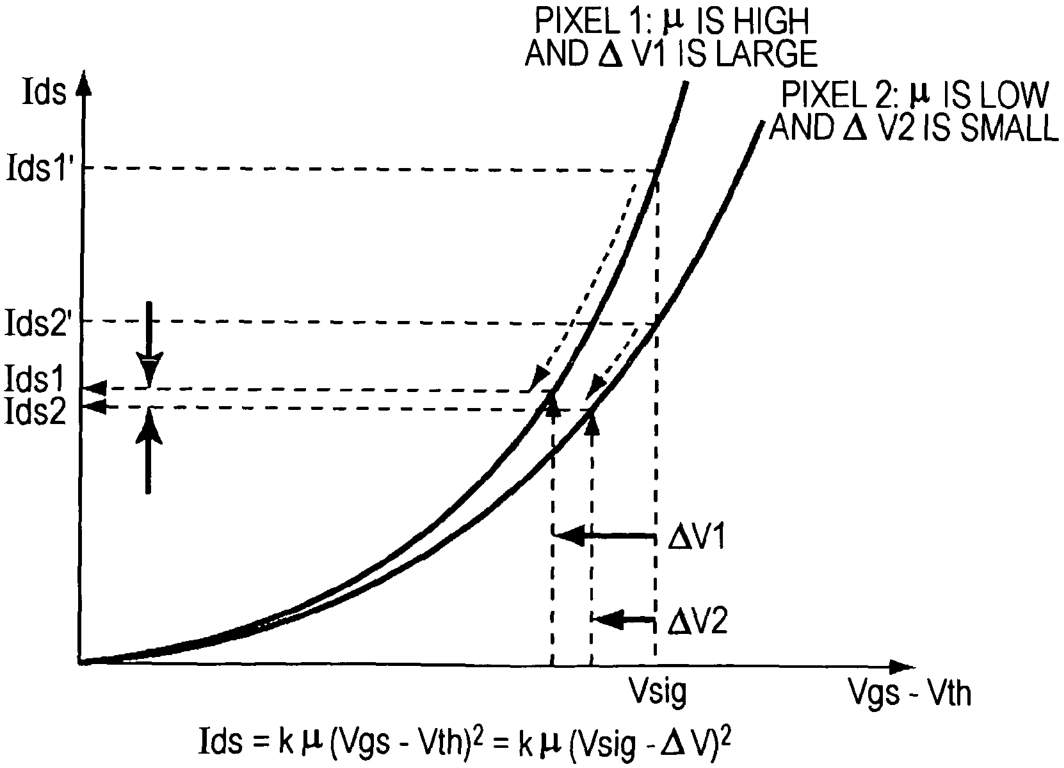
FIG. 6 is a graph for describing the operation.

FIG. 6 is a graph illustrating the above-described transistor characteristic expression 2, in which the vertical axis indicates Ids and the horizontal axis indicates Vsig. The characteristic expression 2 is also shown under the graph. The graph in FIG. 6 shows characteristic curves comparing pixels 1 and 2. The mobility μ of the drive transistor of pixel 1 is relatively high. On the other hand, the mobility μ of the drive transistor included in pixel 2 is relatively low. In this way, when the drive transistor is made of a polysilicon thin film transistor or the like, it is inevitable that the mobility μ varies among pixels. For example, when a video signal Vsig of the same level is written in both pixels 1 and 2 and when any mobility correction is not performed, a significant difference occurs between an output current Ids1' flowing in pixel 1 having the high mobility μ and an output current Ids2' flowing in pixel 2 having the low mobility μ. In this way, a significant difference in output current Ids occurs due to variations in mobility μ, so that uniformity of the screen is impaired.

In the present invention, the variations in mobility are canceled by negatively feeding back an output current to the side of an input voltage. As is clear from the transistor characteristic expression, a high mobility results in a large drain current Ids. Thus, the negative feedback amount ΔV is larger as the mobility is higher. As illustrated in the graph in FIG. 6, a negative feedback amount ΔV1 of pixel 1, having a high mobility μ, is larger than a negative feedback amount ΔV2 of pixel 2, having a low mobility. Thus, a larger amount of negative feedback is applied as the mobility μ is higher, and variations can be suppressed. As illustrated in the figure, when correction of ΔV1 is applied in pixel 1 having a high mobility μ, the output current significantly drops from Ids1' to Ids1. On the other hand, the correction amount ΔV2 in pixel 2 having a low mobility μ is small, and thus the output current Ids2' does not so significantly drop to Ids2. As a result, Ids1 and Ids2 become almost equal to each other, and variations in mobility are canceled. The cancellation of variations in mobility is performed in an entire range of Vsig from a black level to a white level, so that very high uniformity of the screen can be obtained. In summary, when pixels 1 and 2 having different mobilities exist, the correction amount ΔV1 of pixel 1 having a high mobility is smaller than the correction amount ΔV2 of pixel 2 having a low mobility. That is, as the mobility is larger, ΔV is larger and a decrease value of Ids is larger. Accordingly, current values of pixels having different mobilities are uniformed, and variations in mobility can be corrected.

Figure 7:
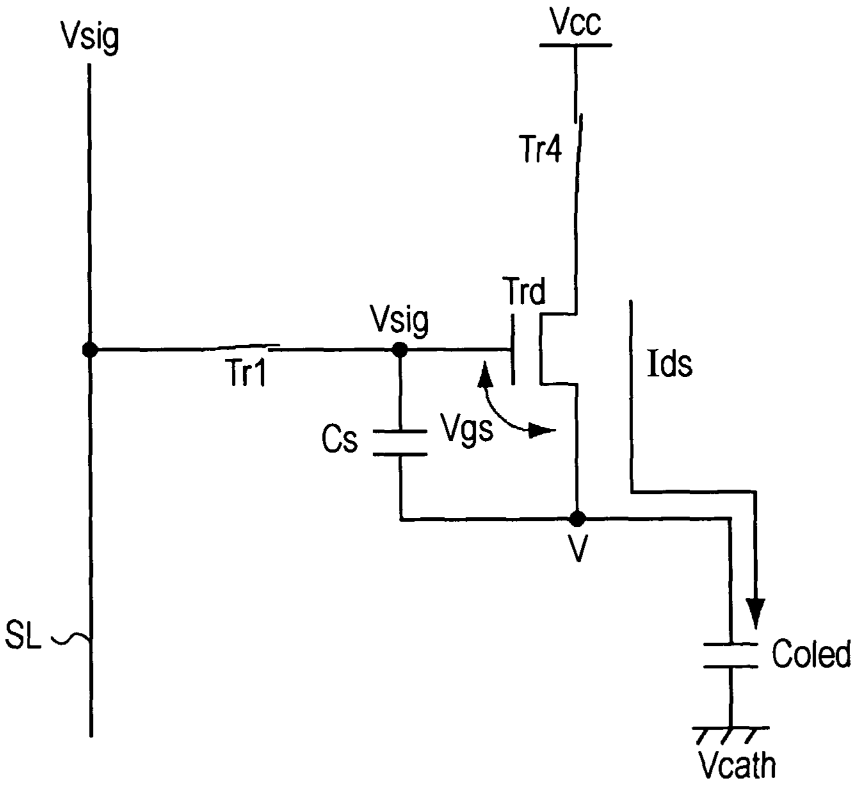
FIG. 7 is a schematic view for describing the operation.

Hereinafter, numeric analysis of the above-described mobility correction is performed for reference, with reference to FIG. 7. As illustrated in FIG. 7, analysis is performed by using the source potential of the drive transistor Trd as a variable V, in a state where the transistors Tr1 and Tr4 are in an ON state. Regarding the source potential (S) of the drive transistor Trd as V, the drain current Ids flowing in the drive transistor Trd is expressed by the following expression 3.

[Equation 1]

$$I_{ds}=k\mu(V_{gs}-V_{th})^2=k\mu(V_{sig}-V-V_{th})^2 \qquad \text{expression 3}$$

Also, based on the relationship between the drain current Ids and the capacitor C (=Cs+Coled), Ids=dQ/dt=CdV/dt is satisfied as shown in the following expression 4.

[Equation 2]

$$I_{ds}=\frac{dQ}{dt}=C\frac{dV}{dt} \text{ thereby } \int\frac{1}{C}dt=\int\frac{1}{I_{ds}}dV \qquad \text{expression 4}$$

$$\Leftrightarrow \int_0^t\frac{1}{C}dt=\int_{-Vth}^{V}\frac{1}{k\mu(V_{sig}-V_{th}-V)^2}dV$$

$$\Leftrightarrow \frac{k\mu}{C}t=\left[\frac{1}{V_{sig}-V_{th}-V}\right]_{-Vth}^{V}=\frac{1}{V_{sig}-V_{th}-V}-\frac{1}{V_{sig}}$$

$$\Leftrightarrow V_{sig}-V_{th}-V=\frac{1}{\frac{1}{V_{sig}}+\frac{k\mu}{C}t}=\frac{V_{sig}}{1+V_{sig}\frac{k\mu}{C}t}$$

Expression 3 is substituted into expression 4, and both sides are integrated. Here, assume that the initial state of the source voltage V is −Vth and that the mobility variation correcting time (T6-T7) is t. By solving this differential equation, a pixel current for the mobility correcting time t can be given as in the following expression 5.

[Equation 3]

$$I_{ds}=k\mu\left(\frac{V_{sig}}{1+V_{sig}\frac{k\mu}{C}t}\right)^2 \qquad \text{expression 5}$$

Figure 8:
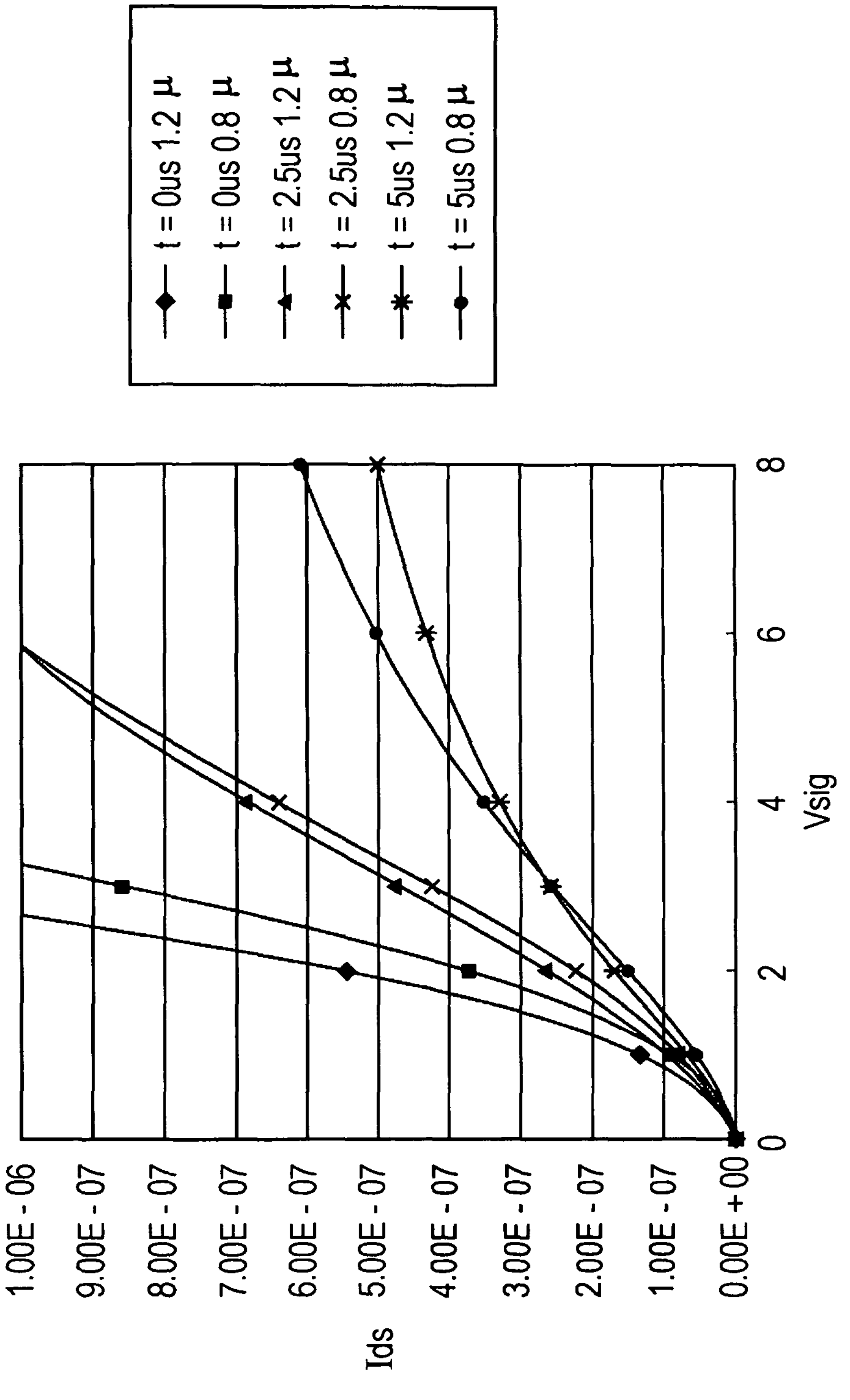
FIG. 8 is a graph illustrating an operation characteristic of a drive transistor included in the pixel circuit illustrated in FIG. 7.

FIG. 8 is a graph illustrating expression 5, in which the vertical axis indicates the output current Ids and the horizontal axis indicates the video signal Vsig. As a parameter, cases where the mobility correcting period t=0 us, 2.5 us, and 5 us are set. Furthermore, the mobility μ is used as a parameter, which is relatively high of 1.2μ or relatively low of 0.8μ. It can be understood that, compared to a case where the mobility is not substantially corrected in t=0 us, variations in mobility can be sufficiently corrected when t=2.5 us. Ids has a 40% variation with no correction of mobility, whereas the variation can be suppressed to 10% or less by performing mobility correction. However, if the correcting period is long in t=5 us, variations in output current Ids become significant due to a difference in mobility μ. In this way, t needs to be set to an optimal value in order to perform an appropriate mobility correction. In the graph illustrated in FIG. 8, the optimal value is around t=2.5 us.

Next, a second embodiment of the pixel circuit according to the present invention is described. In the above-described first embodiment, Vth correction and Vsig writing are performed within one horizontal scanning period (1H), as illustrated in the timing chart in FIG. 4. Accordingly, the number of circuit elements is reduced. However, in the pixel circuit according to the first embodiment, when the resolution is high with a larger number of pixels in the panel or when a field frequency is high for high image quality, the horizontal scanning period (1H) is short, and thus it is possible that Vth correction cannot sufficiently be performed. On the other hand, if a certain Vth correcting period is ensured, the Vsig writing period is squeezed, and it is possible that a video signal cannot sufficiently be written in the pixel capacitor. The second embodiment is made by improving the first embodiment, and can deal with higher resolution and higher quality of the panel. The configuration of the pixel circuit according to the second embodiment is basically the same as that of the pixel circuit according to the first embodiment illustrated in FIG. 2. However, the operation sequence thereof is different, which is described in detail with reference to the timing chart in FIG. 9. For easy understanding, parts corresponding to those in the timing chart in FIG. 4 illustrating the operation of the first embodiment are denoted by corresponding reference numerals.

Figure 9:
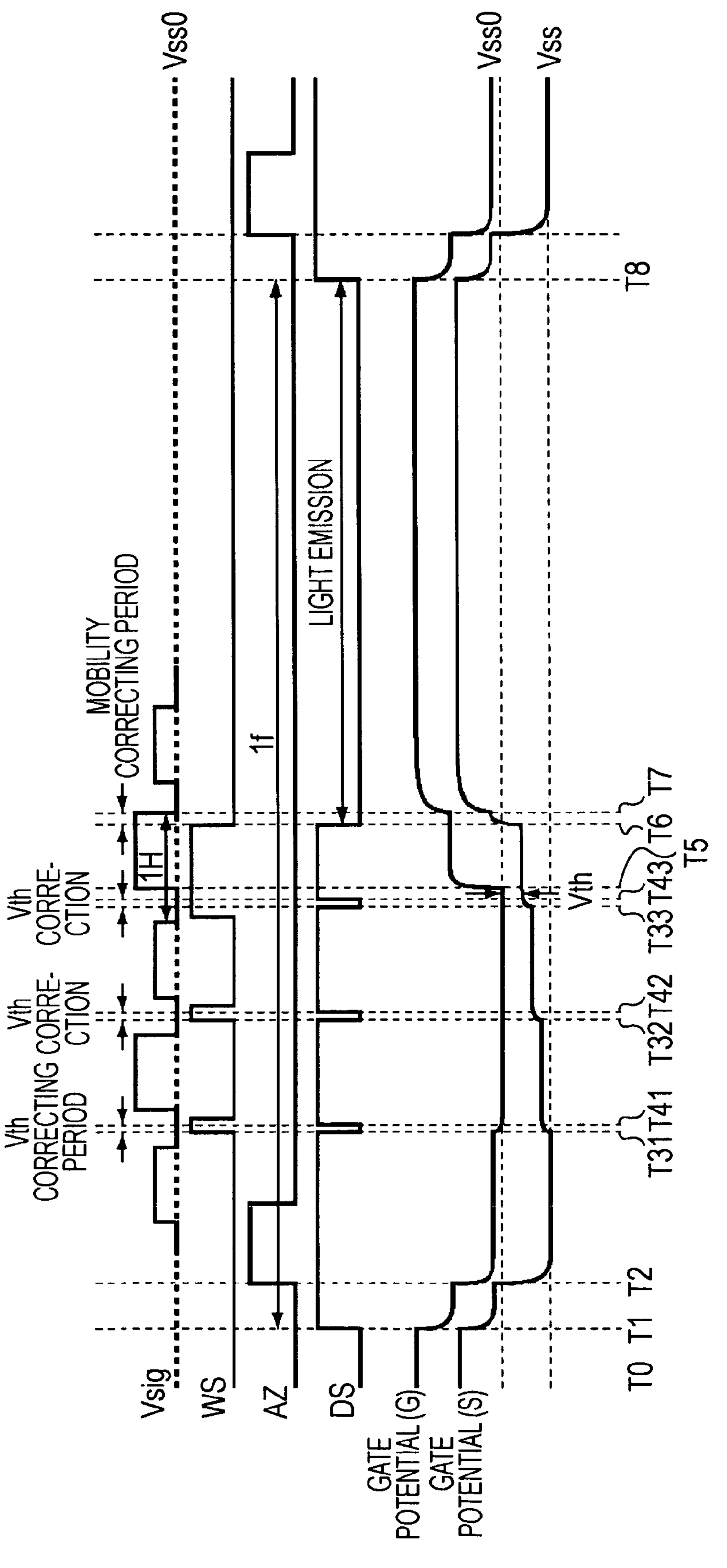
FIG. 9 is a timing chart illustrating a second embodiment of the pixel circuit according to the present invention.

As is clear from referring to FIG. 9, the Vth correcting period is divided into a plurality of periods in this embodiment. Accordingly, although each Vth correcting period is short, a sufficiently long Vth correcting period can be ensured by performing the correction plural times. This enables reduction of the number of circuit elements and dealing with higher resolution and higher frequency of the panel. Each Vth correcting period is very short of several μs, but a total correction amount of the plural times enables sufficient correction of variations in Vth.

Hereinafter, the operation of the second embodiment is described in detail with reference to the timing chart in FIG. 9. First, at timing T1, the control signal DS is allowed to be in a high level and the switching transistor Tr4 is turned OFF.

Then, at timing T2, the control signal AZ is allowed to be in a high level and the switching transistor Tr3 is turned ON. Accordingly, the reference potential Vss is written in the source potential (S) of the drive transistor Trd. At this time, the gate potential (G) is high impedance, so that the gate potential (G) drops in accordance with a drop of the source potential (S).

After that, Vth correction is performed in a timesharing manner in horizontal blanking periods to delimit the respective horizontal scan lines. In each horizontal blanking period, the potential of the signal line is set to the certain potential Vss0. In a first Vth correcting period, the control signal WS becomes a high level and the sampling transistor is turned ON. At this time, the potential of the signal line is set to Vss0, as described above. Here, Vss0−Vss=Vgs>Vth is satisfied, and Vgs>Vth allows preparation for subsequent Vth correction. Also, when the threshold voltage of the light-emitting device EL is VthEL, setting of VthEL>Vss allows a reverse bias to be applied to the light-emitting device EL. This is necessary to normally perform the subsequent Vth correcting operation and the mobility correcting operation.

Then, while keeping the sampling transistor in an ON state, the control signal DS is switched to a low level and the switching transistor Tr4 is turned ON at timing T31. Accordingly, the first Vth correction is performed. At this time, the potential of the signal line is held at the certain potential Vss0 in order to accurately perform Vth correction. Turn ON of the switching transistor Tr4 causes the drive transistor Trd to output the output current Ids toward cut off. Then, at timing T41, the control signal DS is returned to a high level, the switching transistor Tr4 is turned OFF, and the first Vth correction ends. Then, it is desirable that the control signal WS is returned to a low level before the potential of the signal line changes and the sampling transistor is turned OFF. However, even if that operation is not performed, no problem occurs in the operation.

In this embodiment, each Vth correcting period is set to be within the horizontal blanking period. Thus, in one Vth correcting operation, the drive transistor Trd is not cut off and the source potential (S) thereof is held at a mid operation point.

When the potential of the signal line becomes Vss0 again in the next horizontal blanking period, a second Vth correcting operation is performed. That is, WS is switched to a high level so as to bring the sampling transistor Tr1 into conduction. Also, the control signal DS is switched to a low level so as to bring the switching transistor Tr4 into conduction. Accordingly, the second Vth correcting operation is performed. The second Vth correcting period is represented by T32-T42. By performing the series of Vth correcting operation a plurality of times until the drive transistor is cut off, Vth correction is completed.

In the example illustrated in the timing chart in FIG. 9, a third Vth correction is performed in the horizontal blanking period positioned at the head of the horizontal scanning period (1H) assigned to the scan line WS, and then the video signal Vsig is written in the pixel capacitor, and then the mobility μ is corrected. The third Vth correcting period is represented by T33-T43. After the third Vth correction has completed, the difference between the gate potential (G) and the source potential (S) is set to just Vth.

As described above, in this embodiment, the correcting means incorporated in the pixel circuit 2 operates in a plurality of horizontal scanning periods assigned to a plurality of scan lines and charges the pixel capacitor Cs to the threshold voltage Vth in a timesharing manner. The sampling transistor samples the video signal supplied from the signal line SL to the pixel capacitor Cs during a signal supplying period when the signal line SL is at the potential Vsig of the video signal in the horizontal scanning period (1H) assigned to the scan line WS. On the other hand, the correcting means detects the threshold voltage Vth of the drive transistor Trd and charges the pixel capacitor Cs to the threshold voltage Vth in a timesharing manner during a signal fixed period when the signal line SL is at the certain potential Vss0 in each of the horizontal scanning periods assigned to the plurality of scan lines WS. This signal fixed period is a horizontal blanking period to delimit the respective horizontal scanning periods that are sequentially assigned to the respective scan lines WS. The correcting means charges the pixel capacitor Cs to the threshold voltage Vth in a timesharing manner in each horizontal blanking period. Preferably, after the correcting means has charged the pixel capacitor Cs in each signal fixed period, the sampling transistor Tr1 should be closed and the pixel capacitor Cs should be electrically disconnected from the signal line SL before the signal line SL is switched from the certain potential Vss0 to the potential Vsig of the video signal.

Figure 10:
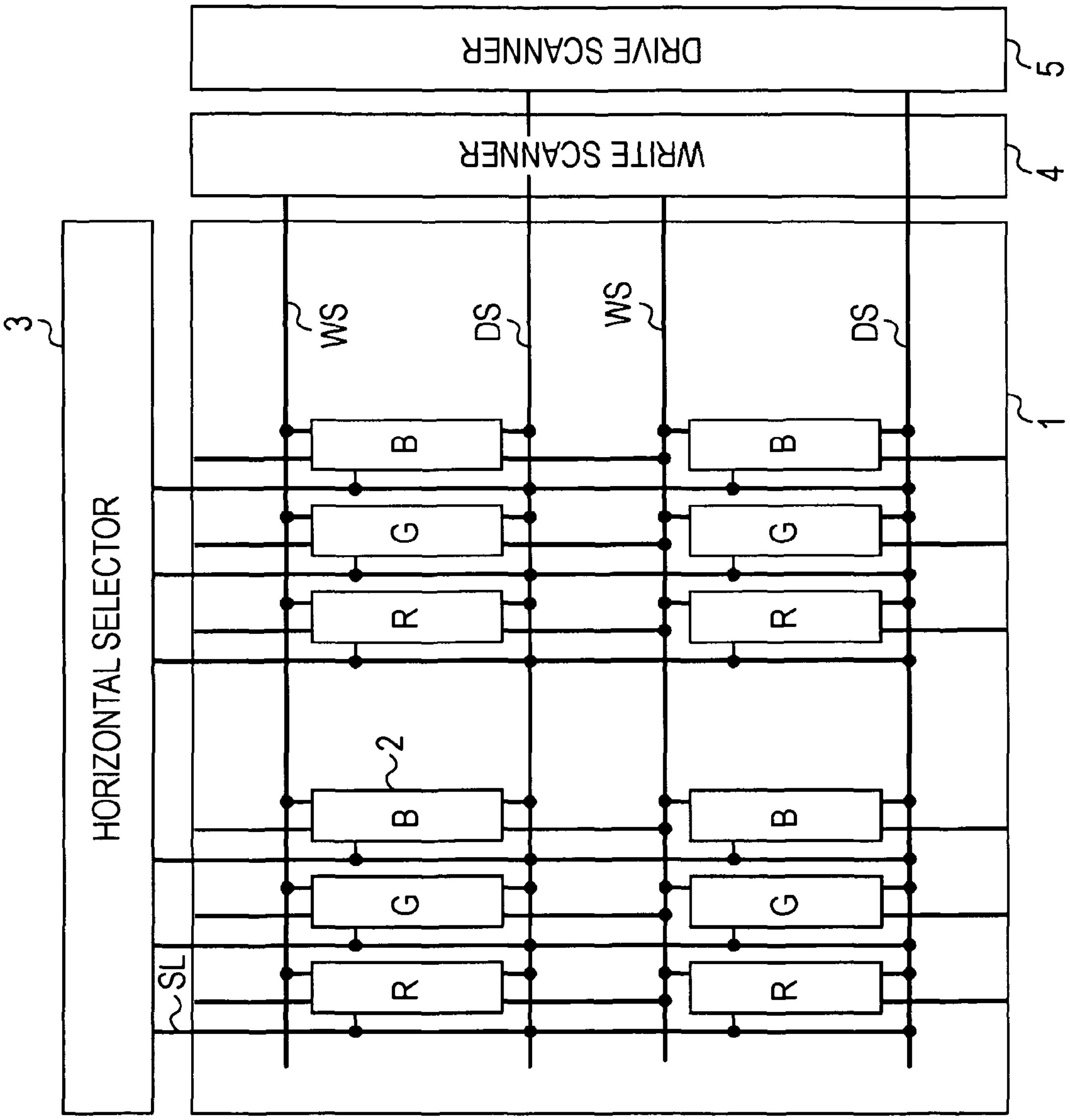
FIG. 10 is a block diagram illustrating a display apparatus according to the present invention.

FIG. 10 is a schematic block diagram illustrating a display apparatus according to a third embodiment of the present invention. For easy understanding, parts corresponding to those of the display apparatus according to the first embodiment illustrated in FIG. 1 are denoted by corresponding reference numerals. The different point is that the pixel array 1 according to the third embodiment includes two types of scan lines WS and DS so as to further reduce the gate lines, whereas the three types of scan lines (gate lines) WS, DS, and AZ are provided in the first embodiment. Specifically, the scan lines AZ are not provided. Instead of the scan line AZ of this stage, the scan line WS of the preceding stage is used. Accordingly, the gate lines can be reduced by one type and also a correcting scanner is not required.

Figure 11:
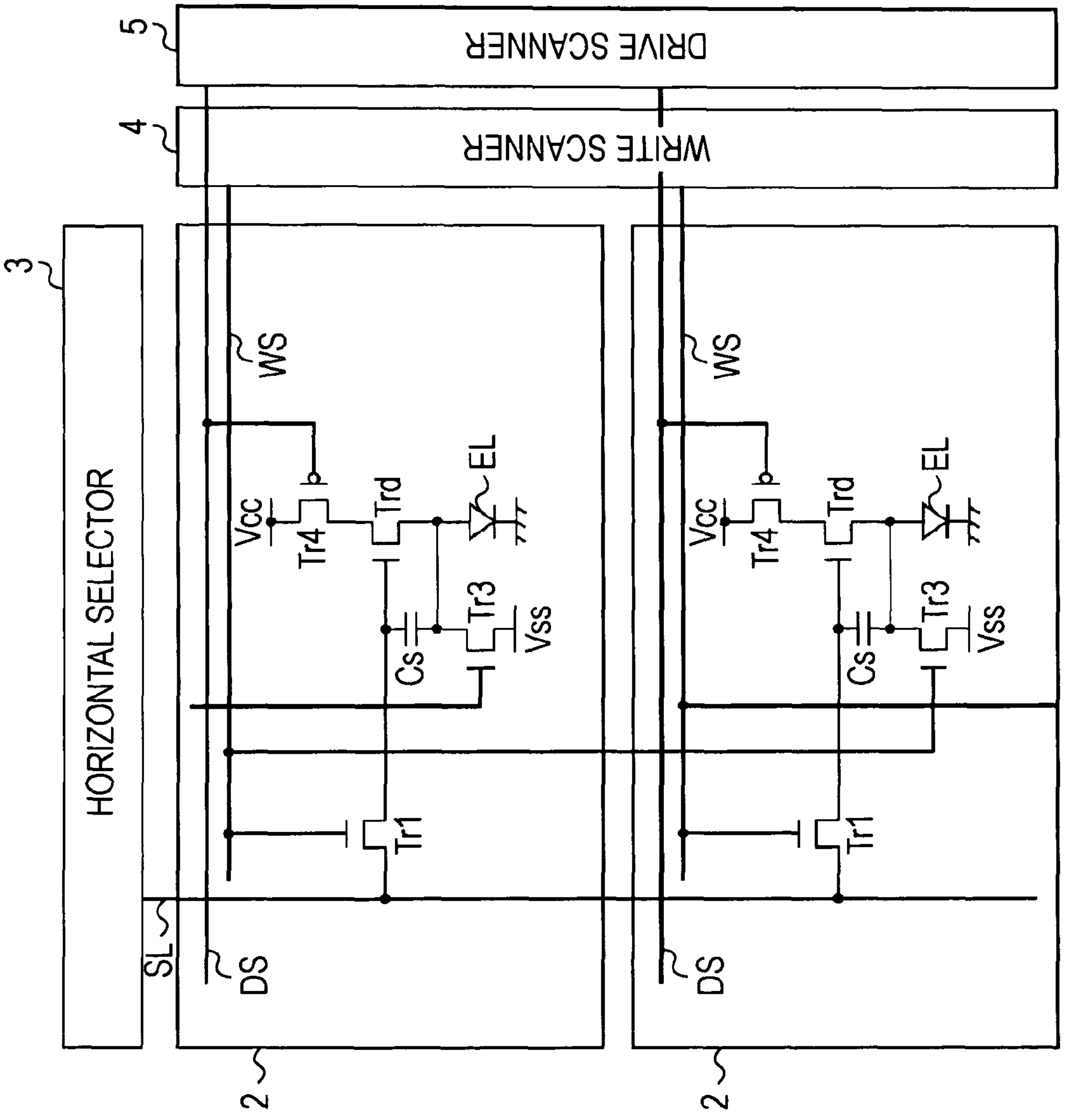
FIG. 11 is a circuit diagram illustrating a third embodiment of pixel circuits included in the display apparatus illustrated in FIG. 10.

FIG. 11 schematically illustrates two pixel circuits, one in the preceding stage and the other in this stage, among the pixel circuits included in the pixel array of the display apparatus illustrated in FIG. 10. The configuration of the respective pixel circuits 2 is basically similar to that of the first embodiment illustrated in FIG. 2, and corresponding parts are denoted by corresponding reference numerals. Each pixel circuit 2 includes the sampling transistor Tr1, the drive transistor Trd, the first switching transistor Tr3, the second switching transistor Tr4, the pixel capacitor Cs, and the light-emitting device EL. The different point is that the scan line WS of the preceding stage connects to the gate of the first switching transistor Tr3. However, the pixel circuit 2 of the first stage does not have the scan line WS of the preceding stage, and thus another supply is required.

Figure 12:
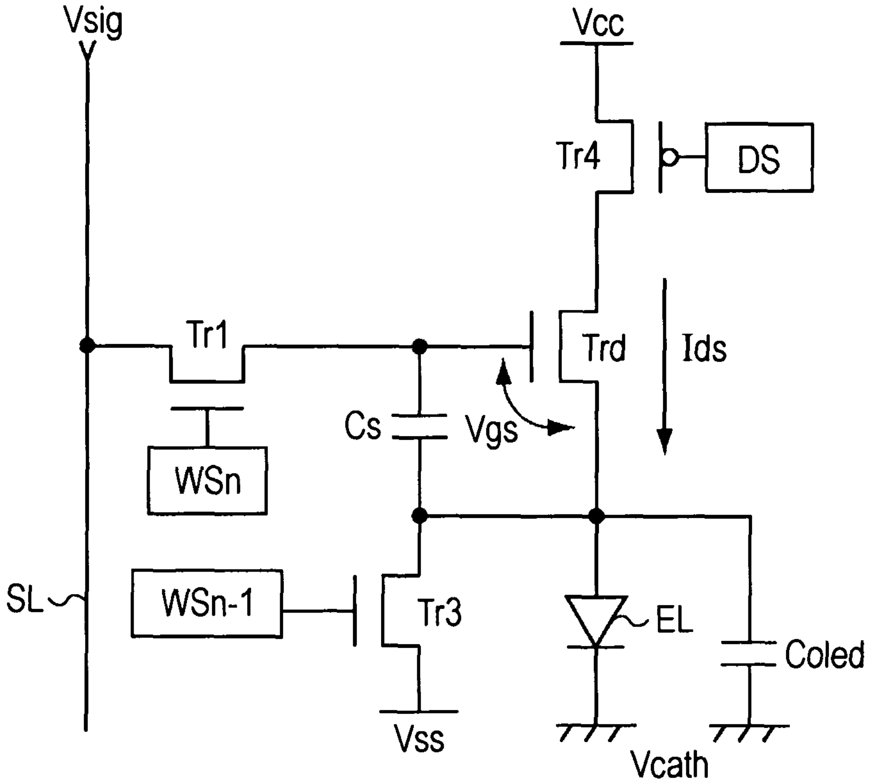
FIG. 12 is a schematic view illustrating a pixel circuit included in the display apparatus illustrated in FIG. 11.

FIG. 12 is a schematic view illustrating one pixel circuit in the pixel array illustrated in FIG. 11. For easy understanding, the video signal Vsig sampled by the sampling transistor Tr1, the input voltage Vgs and the output current Ids of the drive transistor Trd, and also the capacitor component Coled held by the light-emitting device EL are shown. Also, the scan line of this stage connected to the gate of the sampling transistor Tr1 is represented by WSn, the scan line of the preceding stage connected to the gate of the first switching transistor Tr3 is represented by WSn−1, and the scan line connected to the gate of the second switching transistor Tr4 is represented by DS.

Figure 13:
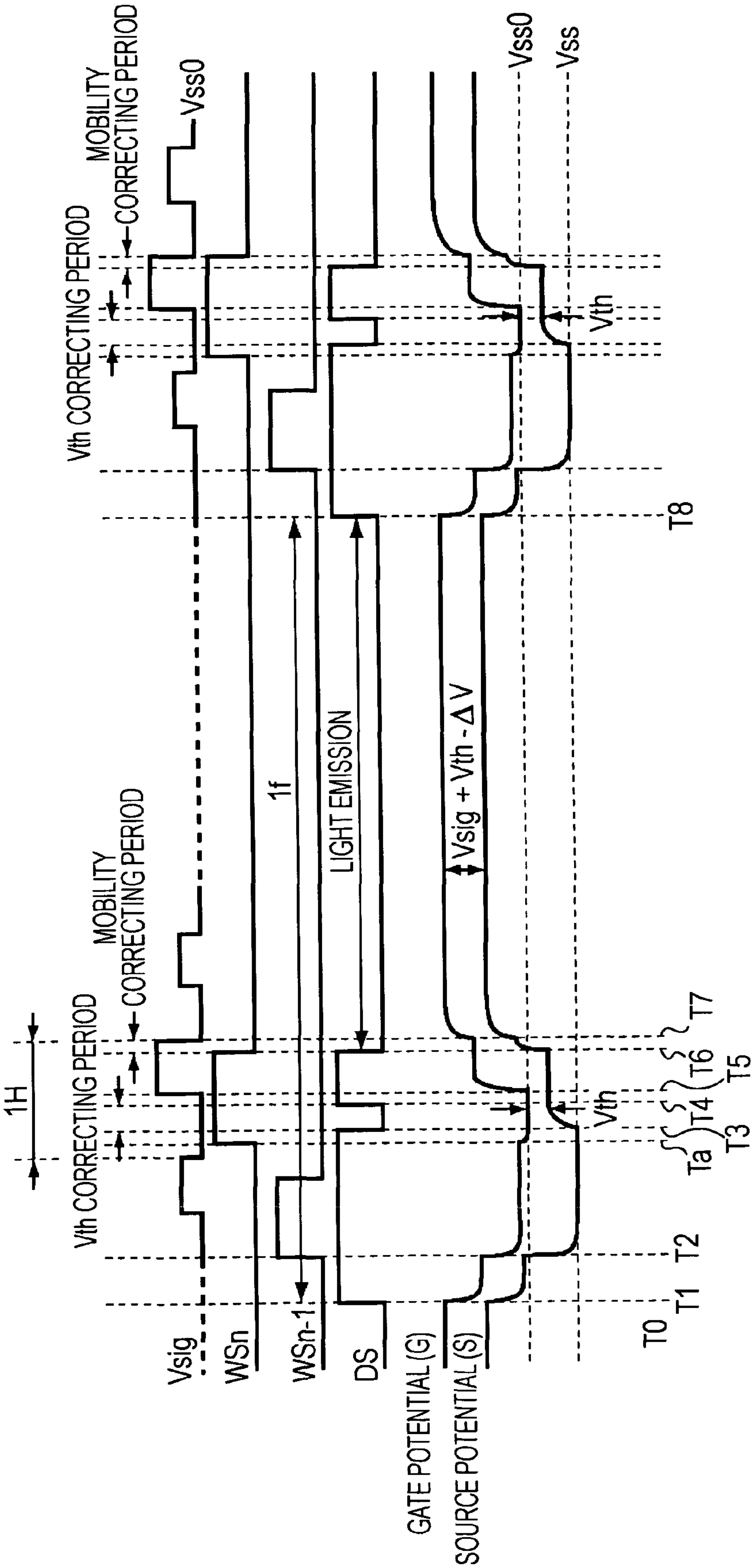
FIG. 13 is a timing chart for describing an operation of the pixel circuit illustrated in FIG. 12.

FIG. 13 is a timing chart illustrating an operation of the pixel circuit illustrated in FIG. 12. For easy understanding, parts corresponding to those in the timing chart of the first embodiment illustrated in FIG. 4 are denoted by corresponding reference numerals. This timing chart illustrates the waveforms of control signals applied to the respective scan lines WSn, WSn−1, and DS along the time axis T. For simple illustration, the control signals are represented by the same codes as those of the corresponding scan lines. Also, this timing chart illustrates changes in potential of the gate G and source S of the drive transistor Trd and the waveform of the video signal Vsig applied to the signal line, together with the waveforms of the respective control signals WSn, WSn−1, and DS. As illustrated in the figure, the video signal Vsig is fixed to the certain potential Vss0 in the first half of each horizontal scanning period and is at the video signal potential in the latter half. At timing T1, the control signal DS becomes a high level, the switching transistor Tr4 is turned OFF, and the pixel circuit enters a non-light-emitting state. At timing T2, the control signal WSn−1 of the preceding stage becomes a high level and the switching transistor Tr3 is turned ON. Accordingly, the pixel capacitor Cs is reset and Vgs>Vth is set. That is, a preparing operation for Vth correction is performed. At timing Ta, the control signal WSn of this stage rises to a high level and the sampling transistor Tr1 is brought into conduction. Then, at timing T3, the control signal DS becomes a low level and the second switching transistor Tr4 is turned ON. Accordingly, the pixel capacitor Cs is charged to write Vth in a state where one end of the pixel capacitor Cs is fixed to the certain potential Css0. That is, a Vth correcting operation is performed. Then, at timing T5, the video signal Vsig is written in the pixel capacitor Cs. Furthermore, at timing T6, an operation of correcting the mobility μ is performed and a light-emitting state starts.

As described above, the third embodiment is provided with the correcting means for detecting the threshold voltage Vth of the drive transistor Trd and writing it in the pixel capacitor Cs in order to cancel the dependency of the output current Ids on the threshold voltage Vth. This correcting means includes the first switching transistor Tr3 and the second switching transistor Tr4. The first switching transistor Tr3 is brought into conduction in response to a control signal WSn−1 supplied from another scan line WSn−1, positioned before the scan line WSn of this stage, during the preceding horizontal scanning period assigned to the other scan line WSn−1, whereby setting is made so that the potential difference across the pixel capacitor Cs exceeds the threshold voltage Vth. The second switching transistor Tr4 is brought into conduction in the horizontal scanning period (1H) assigned to this stage and charges the pixel capacitor Cs until the potential difference (Vgs) across the pixel capacitor Cs becomes the threshold voltage Vth. In the embodiment illustrated in FIG. 13, the scan line WSn−1 positioned immediately before the scan line WSn of this stage is used as the scan line of the preceding stage. In some cases, a scan line WSn−2 before the scan line WSn−1 or a scan line before the scan line WSn−2 can be used as the gate line of the first switching transistor Tr3, instead of the scan line WSn−1. In this way, in this embodiment, the scan line WS is shared by two pixels and thus the gate lines can be reduced by one type. This leads to improvement of yield of panels. Also, simplified layout enables higher resolution of the panel.

Figure 14:
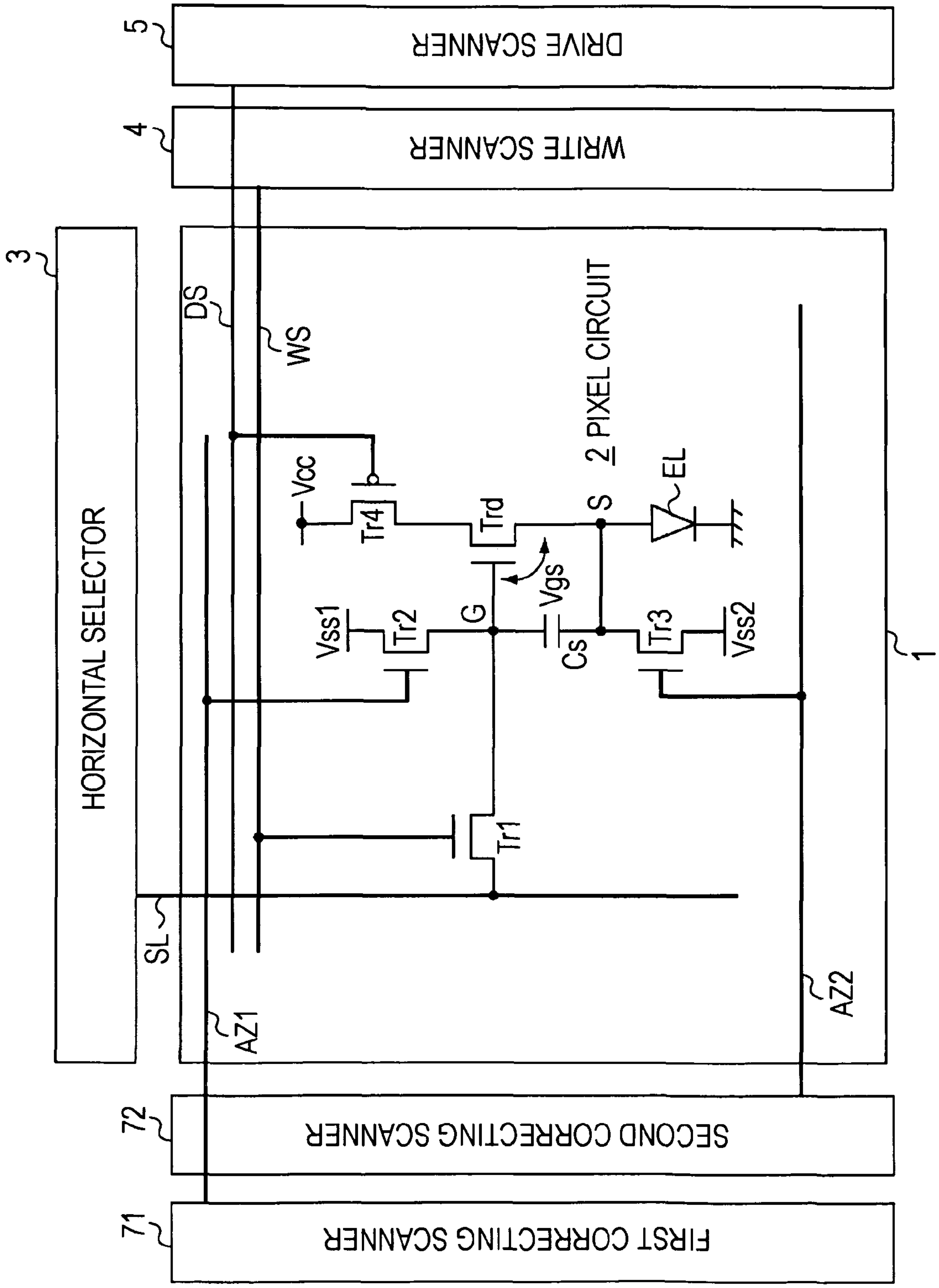
FIG. 14 is a block diagram illustrating a display apparatus according to a reference example.

FIG. 14 is a block diagram illustrating a reference example of the pixel circuit. For easy understanding, parts corresponding to those of the first embodiment illustrated in FIG. 2 are denoted by corresponding reference numerals. The different point is that, in this reference example, the Vth correcting operation is performed before the horizontal scanning period. For this reason, a switching transistor Tr2 is necessary in addition to the switching transistor Tr3 for preparation for Vth correction. The one transistor Tr3 resets a source-side terminal of the pixel capacitor Cs, whereas the additional transistor Tr2 resets a gate-side terminal of the pixel capacitor Cs. In order to drive the additional switching transistor Tr2, an additional scan line AZ1 and an additional correcting scanner 71 is necessary. In the present invention, setting of the gate-side terminal of the pixel capacitor Cs is performed in the horizontal scanning period, so that the transistor Tr2 is unnecessary. The transistor Tr2 writes a power supply voltage Vss1 in the gate G. On the other hand, in the present invention, the fixed potential Vss0 supplied from the signal line SL is written during the horizontal scanning period.

Hereinafter, an operation according to the reference example illustrated in FIG. 14 is described. This active matrix display apparatus includes a pixel array 1 serving as a main unit and a peripheral circuit unit. The peripheral circuit unit includes a horizontal selector 3, a write scanner 4, a drive scanner 5, the first correcting scanner 71, a second correcting scanner 72, and so on. The pixel array 1 includes scan lines WS in rows, signal lines SL in columns, and pixel circuits 2 arranged in a matrix pattern at parts where the both lines cross each other. In the figure, only one pixel circuit 2 is illustrated by enlarging it for easy understanding. The signal lines SL are driven by the horizontal selector 3. The horizontal selector 3 constitutes a signal unit and supplies video signals to the signal lines SL. The scan lines WS are scanned by the write scanner 4. Also, other scan lines DS, AZ1, and AZ2 are provided in parallel with the scan lines WS. The scan lines DS are scanned by the drive scanner 5. The scan lines AZ1 are scanned by the first correcting scanner 71. The scan lines AZ2 are scanned by the second correcting scanner 72. The write scanner 4, the drive scanner 5, the first correcting scanner 71, and the second correcting scanner 72 constitute a scanner unit and sequentially scan rows of pixels in each horizontal period. Each pixel circuit 2 samples a video signal from the signal line SL when selected by the scan line WS. Furthermore, the pixel circuit 2 drives the light-emitting device EL included in the pixel circuit 2 in response to the sampled video signal when selected by the scan line DS. In addition, the pixel circuit 2 performs a predetermined correcting operation when being scanned by the scan lines AZ1 and AZ2.

The pixel circuit 2 includes five thin film transistors Tr1 to Tr4 and Trd, one capacitor element (pixel capacitor) Cs, and one light-emitting device EL. The transistors Tr1 to Tr3 and Trd are N-channel polysilicon TFTs. Only the transistor Tr4 is a P-channel polysilicon TFT. The capacitor element Cs constitutes a capacitor unit of the pixel circuit 2. The light-emitting device EL is a diode-type organic EL device including an anode and a cathode, for example.

In the drive transistor Trd, serving as a main element of the pixel circuit 2, the gate G thereof connects to one end of the pixel capacitor Cs and the source S thereof connects to the other end of the pixel capacitor Cs. Also, the gate G of the drive transistor Trd connects to another reference potential Vss1 via the switching transistor Tr2. The drain of the drive transistor Trd connects to a power supply Vcc via the switching transistor Tr4. The gate of the switching transistor Tr2 connects to the scan line AZ1. The gate of the switching transistor Tr4 connects to the scan line DS. The anode of the light-emitting device EL connects to the source S of the drive transistor Trd, and the cathode is grounded. This ground potential may be represented by Vcath. Also, the switching transistor Tr3 exists between the source S of the drive transistor Trd and a predetermined reference potential Vss2. The gate of the transistor Tr3 connects to the scan line AZ2. On the other hand, the sampling transistor Tr1 is connected between the signal lines SL and the gate G of the drive transistor Trd. The gate of the sampling transistor Tr1 connects to the scan line WS.

In this configuration, the sampling transistor Tr1 is brought into conduction in response to a control signal WS supplied from the scan line WS and samples a video signal Vsig supplied from the signal line SL to the capacitor unit Cs during a predetermined sampling period. The capacitor unit Cs applies an input voltage Vgs between the gate G and source S of the drive transistor in response to the sampled video signal Vsig. The drive transistor Trd supplies an output current Ids in accordance with the input voltage Vgs to the light-emitting device EL during a predetermined light-emitting period. Note that the output current (drain current) Ids has dependency on carrier mobility μ and a threshold voltage Vth in a channel region of the drive transistor Trd. The light-emitting device EL emits light at brightness in accordance with the video signal Vsig by the output current Ids supplied from the drive transistor Trd.

The pixel circuit 2 includes correcting means including the switching transistors Tr2 to Tr4, and corrects the input voltage Vgs held in the capacitor unit Cs in advance at the head of a light-emitting period in order to cancel the dependency of the output current Ids on the carrier mobility μ. Specifically, the connecting means (Tr2 to Tr4) operates in part of the sampling period in response to control signals WS and DS supplied from the scan lines WS and DS, takes the output current Ids from the drive transistor Trd in a state where the video signal Vsig is sampled, and negatively feeds back the output current Ids to the capacitor unit Cs, so as to correct the input voltage Vgs. Furthermore, this correcting means (Tr2 to Tr4) detects the threshold voltage Vth of the drive transistor Trd prior to the sampling period and adds the detected threshold voltage Vth to the input voltage Vgs in order to cancel the dependency of the output current Ids on the threshold voltage Vth.

The drive transistor Trd is an N-channel transistor. The drain thereof connects to the power supply Vcc side, whereas the source S connects to the light-emitting device EL side. In this case, the above-described correcting means takes the output current Ids from the drive transistor Trd and negatively feeds back the output current Ids to the capacitor unit Cs side at a head part of the light-emitting period that overlaps a latter part of the sampling period. At that time, the correcting means allows the output current Ids, taken from the source S side of the drive transistor Trd at the head part of the light-emitting period, to flow into the capacitor held by the light-emitting device EL. Specifically, the light-emitting device EL is a diode-type light-emitting device including an anode and a cathode. The anode side connects to the source S of the drive transistor Trd, whereas the cathode side is grounded. In this configuration, the correcting means (Tr2 to Tr4) sets between the anode and cathode of the light-emitting device EL to a reverse bias state in advance, and allows the diode-type light-emitting device EL to function as a capacitor element when the output current Ids taken from the source S side of the drive transistor Trd flows into the light-emitting device EL. Also, the correcting means can adjust a time width t, when the output current Ids is taken from the drive transistor Trd, in the sampling period, thereby optimizing a negative feedback amount of the output current Ids to the capacitor unit Cs.

Figure 15:
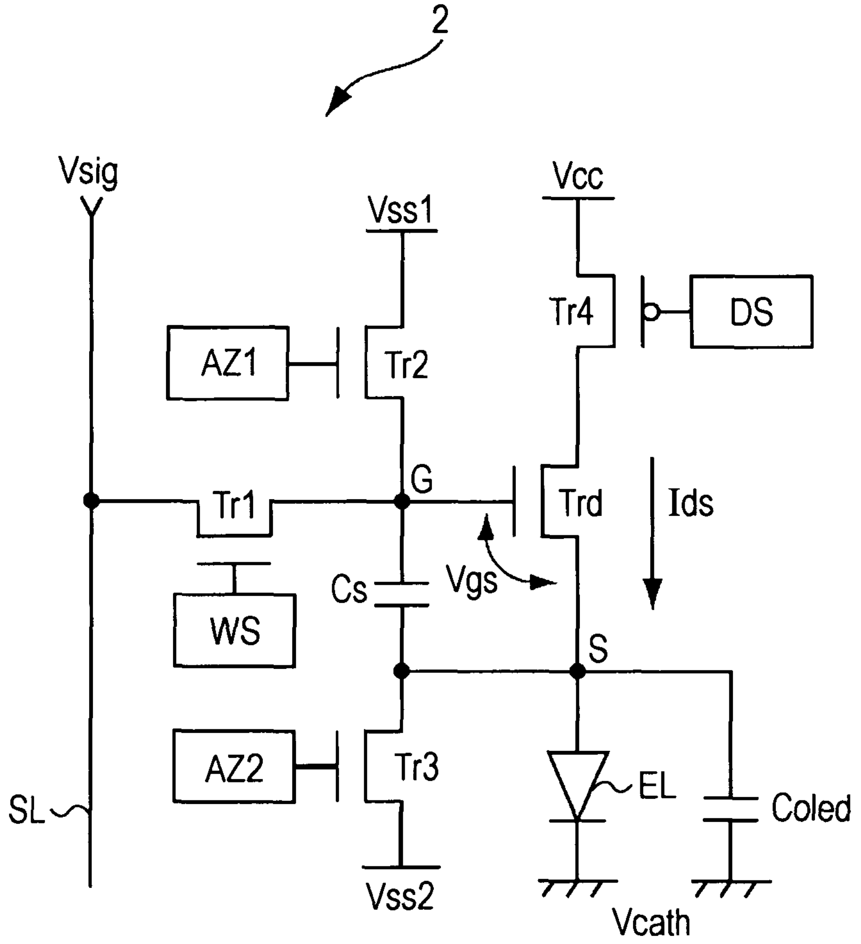
FIG. 15 is a schematic view of a pixel circuit included in the display apparatus illustrated in FIG. 14.

FIG. 15 is a schematic view illustrating the part of the pixel circuit in the display apparatus illustrated in FIG. 14. For easy understanding, the video signal Vsig sampled by the sampling transistor Tr1, the input voltage Vgs and the output current Ids of the drive transistor Trd, and also the capacitor component Coled held by the light-emitting device EL are shown. Hereinafter, a basic operation of the pixel circuit 2 is described based on FIG. 15.

Figure 16:
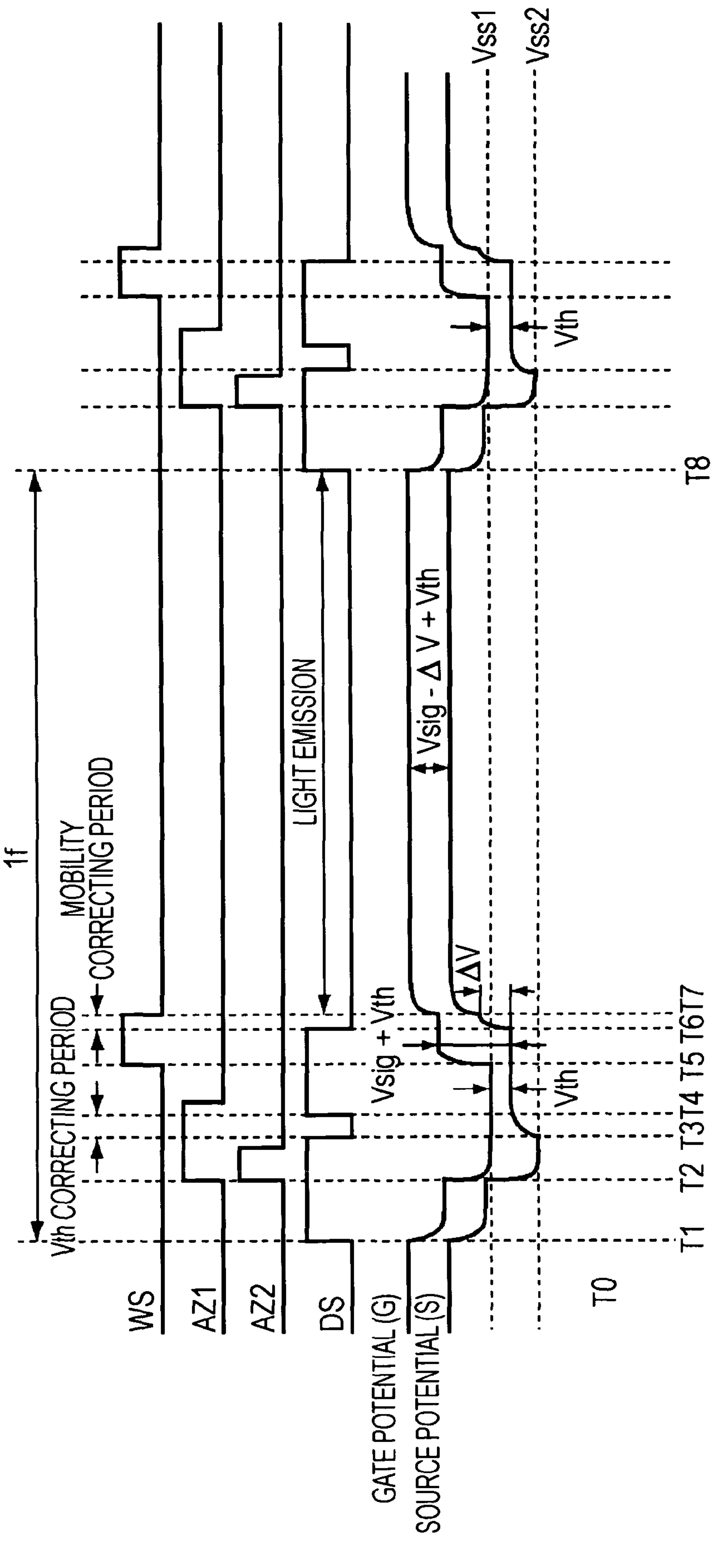
FIG. 16 is a timing chart for describing an operation of the pixel circuit illustrated in FIG. 15.

FIG. 16 is a timing chart of the pixel circuit illustrated in FIG. 15. The operation of the pixel circuit illustrated in FIG. 15 is specifically described in detail with reference to FIG. 16. FIG. 16 illustrates the waveforms of control signals applied to the respective scan lines WS, AZ1, AZ2, and DS along a time axis T. For simplifying the illustration, the control signals are represented by the same codes as those of the corresponding scan lines. The transistors Tr1, Tr2, and Tr3, which are N-channel transistors, are turned ON when the scan lines WS, AZ1, and AZ2 are in a high level and are turned OFF in a low level. On the other hand, the transistor Tr4, which is a P-channel transistor, is turned OFF when the scan line DS is in a high level and is turned ON in a low level. Also, this timing chart illustrates changes in potential of the gate G and source S of the drive transistor Trd, together with the waveforms of the respective control signals WS, AZ1, AZ2, and DS.

In the timing chart in FIG. 16, timings T1 to T8 correspond to one field (1*f*). The respective rows of the pixel array are sequentially scanned once during the one field. The timing chart illustrates the waveforms of the respective control signals WS, AZ1, AZ2, and DS that are applied to the pixels of one row.

At timing T0 before the field starts, all the control signals WS, AZ1, AZ2, and DS are in a low level. Thus, the N-channel transistors Tr1, Tr2, and Tr3 are in an OFF state, whereas only the P-channel transistor Tr4 is in an ON state. Thus, the drive transistor Trd connects to the power supply Vcc via the ON-state transistor Tr4, and thus supplies the output current Ids to the light-emitting device EL in accordance with the predetermined input voltage Vgs. Thus, the light-emitting device EL emits light at timing T0. The input voltage Vgs applied to the drive transistor Trd at this time is represented by a difference between a gate potential (G) and a source potential (S).

At timing T1 when the field starts, the control signal DS is switched from a low level to a high level. Accordingly, the transistor Tr4 is turned OFF and the drive transistor Trd is disconnected from the power supply Vcc, so that light emission stops to enter a non-light-emitting period. Therefore, at timing T1, all the transistors Tr1 to Tr4 are brought into an OFF state.

Then, at timing T2, the control signals AZ1 and AZ2 become a high level, so that the switching transistors Tr2 and Tr3 are turned ON. As a result, the gate G of the drive transistor Trd is connected to the reference potential Vss1, and the source S is connected to the reference potential Vss2. Here, Vss1−Vss2>Vth is satisfied. By setting Vss1−Vss2=Vgs>Vth, a preparation for Vth correction performed at timing T3 is performed. In other words, the period T2-T3 corresponds to a reset period of the drive transistor Trd. Also, when the threshold voltage of the light-emitting device EL is represented by VthEL, VthEL>Vss2 is set. Accordingly, a minus bias is applied to the light-emitting device EL and a so-called reverse bias state occurs. This reverse bias state is necessary for normally performing a Vth correcting operation and a mobility correcting operation later.

Just before timing T3, the control signal AZ2 is allowed to be in a low level. Also, at timing T3, the control signal DS is allowed to be in a low level. Accordingly, the transistor Tr3 is turned OFF, whereas the transistor Tr4 is turned ON. As a result, the drain current Ids flows into the pixel capacitor Cs and the Vth correcting operation starts. At this time, the gate G of the drive transistor Trd is held at Vss1, and the current Ids flows until the drive transistor Trd is cut off. After the cut off, the source potential (S) of the drive transistor Trd becomes Vss1−Vth. At timing T4 after the drain current is cut off, the control signal DS is returned to a high level and the switching transistor Tr4 is turned OFF. Furthermore, the control signal AZ1 is returned to a low level and the switching transistor Tr2 is turned OFF. As a result, Vth is held and fixed in the pixel capacitor Cs. As described above, timing T3-T4 is a period to detect the threshold voltage Vth of the drive transistor Trd. Here, this detecting period T3-T4 is called a Vth correcting period.

At timing T5 after Vth correction has been performed in the above-described manner, the control signal WS is switched to a high level, the sampling transistor Tr1 is turned ON, and the video signal Vsig is written in the pixel capacitor Cs. The pixel capacitor Cs is sufficiently small compared to the equivalent capacitor Coled of the light-emitting device EL. As a result, a most part of the video signal Vsig is written into the pixel capacitor Cs, precisely, to Vss1. A difference Vsig−Vss1 of Vsig is written in the pixel capacitor Cs. Therefore, the voltage Vgs between the gate G and source S of the drive transistor Trd becomes a level of the sum of the Vth that has been previously detected and held and the Vsig−Vss1 that is sampled this time (Vsig−Vss1+Vth). Hereinafter, it is assumed that Vss1=0 V for easy description, then the gate-source voltage Vgs becomes Vsig+Vth, as illustrated in the timing chart in FIG. 7. Sampling of the video signal Vsig is performed until timing T7, when the control signal WS returns to a low level. That is, timing T5-T7 corresponds to the sampling period.

At timing T6, before timing T7 when the sampling period ends, the control signal DS becomes a low level and the switching transistor Tr4 is turned ON. Accordingly, the drive transistor Trd is connected to the power supply Vcc, so that the pixel circuit enters a light-emitting period from a non-light-emitting period. In this way, mobility correction of the drive transistor Trd is performed in the period T6-T7 when the sampling transistor Tr1 is still in an ON state and the switching transistor Tr4 is brought into an ON state. That is, in this embodiment, mobility correction is performed in the period T6-T7 when a latter part of the sampling period and a head part of the light-emitting period overlap each other. Note that, at the head of the light-emitting period to perform mobility correction, the light-emitting device EL is actually in a reverse bias state, and thus does not emit light. In this mobility correcting period T6-T7, the drain current Ids flows in the drive transistor Trd in a state where the gate G of the drive transistor Trd is fixed to the level of the video signal Vsig. Here, by setting Vss1−Vth<VthEL, the light-emitting device EL is kept in a reverse bias state, and thus has a simple capacitance characteristic instead of a diode characteristic. Accordingly, the current Ids flowing in the drive transistor Trd is written in a capacitor C=Cs+Coled, the sum of the pixel capacitor Cs and the equivalent capacitor Coled of the light-emitting device EL. Accordingly, the source potential (S) of the drive transistor Trd rises. In the timing chart in FIG. 16, this rise is represented by ΔV. This rise ΔV is eventually subtracted from the gate-source voltage Vgs held in the pixel capacitor Cs, which corresponds to negative feedback. In this way, by negatively feeding back the output current Ids of the drive transistor Trd to the input voltage Vgs of the drive transistor Trd, the mobility μ can be corrected. The negative feedback amount ΔV can be optimized by adjusting the time width t of the mobility correcting period T6-T7.

At timing T7, the control signal WS becomes a low level and the sampling transistor Tr1 is turned OFF. As a result, the gate G of the drive transistor Trd is disconnected from the signal line SL. Since application of the video signal Vsig stops, the gate potential (G) of the drive transistor Trd can rise, and rises with the source potential (S). During that time, the gate-source voltage Vgs held in the pixel capacitor Cs maintains a value of (Vsig−ΔV+Vth). The reverse bias state of the light-emitting device EL is canceled in accordance with a rise of the source potential (S), and thus flow-in of the output current Ids causes the light-emitting device EL to actually start emitting light. The relationship between the drain current Ids and the gate voltage Vgs at this time is given as in the following expression 2, by substituting Vsig−ΔV+Vth to Vgs of the above transistor characteristic expression 1.

$$Ids=k\mu(Vgs-Vth)^2=k\mu(Vsig-\Delta V)^2 \quad \text{expression 2}$$

In expression 2, k=(½)(W/L)Cox. The term of Vth is canceled from this characteristic expression 2, and it is understood that the output current Ids supplied to the light-emitting device EL does not depend on the threshold voltage Vth of the drive transistor Trd. Basically, the drain current Ids is determined by the signal voltage Vsig of the video signal. In other words, the light-emitting device EL emits light at brightness in accordance with the video signal Vsig. At that time, Vsig is corrected with the feedback amount ΔV. This correction amount ΔV acts to cancel the effect of the mobility μ positioned at a coefficient part of the characteristic expression 2. Thus, the drain current Ids substantially depends on only the video signal Vsig.

Finally, at timing T8, the control signal DS becomes a high level, the switching transistor Tr4 is turned OFF, and light emission ends and also the field ends. Then, the next field starts and the Vth correcting operation, the mobility correcting operation, and the light emitting operation are repeated again.

The invention claimed is:

1. A pixel circuit that is located where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor during a horizontal scanning period assigned to the scan line, wherein the pixel capacitor applies an input voltage to a gate of the drive transistor in response to the sampled video signal, wherein the drive transistor supplies an output current in accordance with the input voltage to the light-emitting device during a predetermined light-emitting period and the output current has dependency on a threshold voltage in a channel region of the drive transistor, and wherein the light-emitting device emits light at brightness in accordance with the video signal by the output current supplied from the drive transistor, wherein the pixel circuit performs a correction during the horizontal scanning period, the correction comprises detecting the threshold voltage of the drive transistor and writing the threshold voltage in the pixel capacitor in order to cancel the dependency of the output current on the threshold voltage, wherein the sampling transistor samples the video signal during a signal supplying period when the signal line is at a potential of the video signal in the horizontal scanning period, wherein the correction further comprises detecting the threshold voltage of the drive transistor and writing the threshold voltage in the pixel capacitor during a signal fixed period when the signal line is at a certain potential in the horizontal scanning period, and wherein the correction is performed during signal fixed periods in horizontal scanning periods assigned to other scan lines and charges the pixel capacitor to the threshold voltage in a timesharing manner in each signal fixed period.

2. The pixel circuit according to claim 1, wherein the correction is performed during the horizontal scanning period in a state when the sampling transistor is conductive and one end of the pixel capacitor is held at a certain potential by the signal line and charges the pixel capacitor until a potential difference from the other end of the pixel capacitor to the certain potential becomes the threshold voltage.

3. The pixel circuit according to claim 1, wherein: the correction comprises detecting the threshold voltage of the drive transistor and writing the threshold voltage in the pixel capacitor in a first half of the horizontal scanning period;

the sampling transistor samples the video signal supplied from the signal line to the pixel capacitor in a latter half of the horizontal scanning period;

and the pixel capacitor applies an input voltage between the gate and source of the drive transistor, the input voltage being a sum of the sampled video signal and the written threshold voltage, thereby cancelling the dependency of the output current on the threshold voltage.

4. The pixel circuit according to claim 1, wherein the correction is performed using:

a first switching transistor configured to become conductive before the horizontal scanning period and to make a potential difference across the pixel capacitor exceed the threshold voltage; and a second switching transistor configured to become conductive during the horizontal scanning period and to charge the pixel capacitor until the potential difference across the pixel capacitor becomes the threshold voltage.

5. The pixel circuit according to claim 4, wherein the first switching transistor is configured to become conductive in response to a control signal supplied from another scan line positioned before the scan line during a preceding horizontal scanning period assigned to the other scan line, thereby making the potential difference across the pixel capacitor exceed the threshold voltage.

6. The pixel circuit according to claim 5, wherein the first switching transistor is configured to become conductive in response to a control signal supplied from another scan line positioned just before the scan line during an immediately preceding horizontal scanning period assigned to the other scan line, thereby making the potential difference across the pixel capacitor exceed the threshold voltage.

7. The pixel circuit according to claim 1, wherein the signal fixed periods are horizontal blanking periods to delimit the respective horizontal scanning periods that are sequentially assigned to the respective scan lines, and correction comprises charging the pixel capacitor to the threshold voltage in a timesharing manner in each horizontal blanking period.

8. The pixel circuit according to claim 1, wherein, after charging the pixel capacitor during the correction in each signal fixed period, the sampling transistor is closed, and the pixel capacitor is electrically disconnected from the signal line before the signal line is switched from the certain potential to the potential of the video signal.

9. The pixel circuit according to claim 1, wherein the output current of the drive transistor has dependency also on carrier mobility in addition to the threshold voltage in the channel region, and the correction is performed during the horizontal scanning period, the correction comprises taking the output current from the drive transistor in a state where the video signal is sampled, and negatively feeding back the output current to the pixel capacitor to correct the input voltage, in order to cancel the dependency of the output current on the carrier mobility.

10. A pixel circuit that is located where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor during a horizontal scanning period assigned to the scan line, wherein the pixel capacitor applies an input voltage to a gate of the drive transistor in response to the sampled video signal, wherein the drive transistor supplies an output current in accordance with the input voltage to the light-emitting device during a predetermined light-emitting period and the output current has dependency on a threshold voltage in a channel region of the drive transistor, and wherein the light-emitting device emits light at brightness in accordance with the video signal by the output current supplied from the drive transistor, wherein the pixel circuit comprises a correcting portion that detects the threshold voltage of the drive transistor and writes the threshold voltage in the pixel capacitor in order to cancel the dependency of the output current on the threshold voltage, wherein the correcting portion includes a first switching transistor and a second switching transistor, wherein the first switching transistor is brought into conduction in response to a control signal supplied from another scan line positioned before the scan line during a preceding horizontal scanning period assigned to the other scan line, thereby making setting so that a potential difference across the pixel capacitor exceeds the threshold voltage, and wherein the second switching transistor is brought into conduction during the horizontal scanning period and charges the pixel capacitor until the potential difference across the pixel capacitor becomes the threshold voltage, and wherein the correcting portion performs a correction during signal fixed periods in horizontal scanning periods assigned to other scan lines and charges the pixel capacitor to the threshold voltage in a timesharing manner in each signal fixed period.

11. The pixel circuit according to claim 10, wherein the first switching transistor is brought into conduction in response to a control signal supplied from another scan line positioned just before the scan line during an immediately preceding horizontal scanning period assigned to the other scan line, thereby making the potential difference across the pixel capacitor exceed the threshold voltage.

12. A pixel circuit that is located where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor during a horizontal scanning period assigned to the scan line, wherein the pixel capacitor applies an input voltage to a gate of the drive transistor in response to the sampled video signal, wherein the drive transistor supplies an output current in accordance with the input voltage to the light-emitting device during a predetermined light-emitting period and the output current has dependency on a threshold voltage in a channel region of the drive transistor, and wherein the light-emitting device emits light at brightness in accordance with the video signal by the output current supplied from the drive transistor, wherein the pixel circuit performs a correction by detecting the threshold voltage of the drive transistor and writing the threshold voltage in the pixel capacitor prior to sampling of the video signal in order to cancel the dependency of the output current on the threshold voltage, and wherein the correction is performed during a plurality of horizontal scanning periods assigned to a plurality of scan lines and charges the pixel capacitor to the threshold voltage in a timesharing manner, wherein the sampling transistor samples the video signal supplied from the signal line to the pixel capacitor during a signal supplying period when the signal line is at a potential of the video signal in the horizontal scanning period assigned to the scan line, and the correction comprises detecting the threshold voltage of the drive transistor and charging the pixel capacitor to the threshold voltage in a timesharing manner during respective signal fixed periods when the signal line is at a certain potential in the respective horizontal scanning periods assigned to the plurality of scan lines.

13. The pixel circuit according to claim 12, wherein the signal fixed periods are horizontal blanking periods to delimit the respective horizontal scanning periods that are sequentially assigned to the respective scan lines, and the correction comprises charging the pixel capacitor to the threshold voltage in a timesharing manner in each horizontal blanking period.

14. The pixel circuit according to claim 12, wherein, after charging the pixel capacitor during the correction during each signal fixed period, the sampling transistor is closed, and the pixel capacitor is electrically disconnected from the signal line before the signal line is switched from the certain potential to the potential of the video signal.

15. A display apparatus that is located where a scan line in a row supplying a control signal and a signal line in a column supplying a video signal cross each other and that includes at least a sampling transistor, a pixel capacitor connected to the sampling transistor, a drive transistor connected to the pixel capacitor, and a light-emitting device connected to the drive transistor, wherein the sampling transistor is brought into conduction in response to the control signal supplied from the scan line and samples the video signal supplied from the signal line to the pixel capacitor, wherein the pixel capacitor applies an input voltage to a gate of the drive transistor in response to the sampled video signal, wherein the drive transistor supplies an output current in accordance with the input voltage to the light-emitting device, and wherein the light-emitting device emits light at brightness in accordance with the video signal by the output current supplied from the drive transistor, the display apparatus performs a correction by detecting the threshold voltage of the drive transistor and writing the threshold voltage in the pixel capacitor, and wherein the correction is performed during signal fixed periods in horizontal scanning periods assigned to other scan lines and charges the pixel capacitor to the threshold voltage in a timesharing manner in each signal fixed period.

16. The display apparatus according to claim 15, wherein the correction is performed during in a state where the sampling transistor is in conduction and one end of the pixel capacitor is held at a certain potential by the signal line and charges the pixel capacitor until a potential difference from the other end of the pixel capacitor to the certain potential becomes the threshold voltage.

* * * * *